US008363092B2

(12) United States Patent
Okamoto

(10) Patent No.: US 8,363,092 B2
(45) Date of Patent: Jan. 29, 2013

(54) IMAGE TAKING APPARATUS, IMAGE REPRODUCING APPARATUS, IMAGE TAKING METHOD AND PROGRAM

(75) Inventor: Satoru Okamoto, Miyagi (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 13/291,846

(22) Filed: Nov. 8, 2011

(65) Prior Publication Data

US 2012/0050569 A1 Mar. 1, 2012

Related U.S. Application Data

(63) Continuation of application No. 12/123,894, filed on May 20, 2008, now Pat. No. 8,072,485.

(30) Foreign Application Priority Data

May 21, 2007 (JP) ................................. 2007-134267

(51) Int. Cl.
*H04N 13/02* (2006.01)
(52) U.S. Cl. ................. 348/46; 348/37; 348/38; 348/39; 348/159; 386/223; 386/224; 375/240.26
(58) Field of Classification Search .................... 348/37, 348/38, 39, 47, 48, 49, 50, 159, 46; 386/223, 386/224; 375/240.26
See application file for complete search history.

(56) References Cited

U.S. PATENT DOCUMENTS

| | | | | | |
|---|---|---|---|---|---|
| 4,567,532 | A | * | 1/1986 | Baer et al. ...................... | 386/223 |
| 5,384,588 | A | * | 1/1995 | Martin et al. ................. | 348/14.1 |
| 5,719,620 | A | * | 2/1998 | Allio .............................. | 348/49 |
| 5,745,126 | A | * | 4/1998 | Jain et al. ....................... | 382/154 |
| 5,877,801 | A | * | 3/1999 | Martin et al. ................... | 348/36 |
| 6,263,100 | B1 | * | 7/2001 | Oshino et al. ................. | 382/154 |
| 6,323,862 | B1 | * | 11/2001 | Oxaal ............................ | 345/581 |
| 6,545,702 | B1 | * | 4/2003 | Konolige et al. ............... | 348/36 |
| 6,573,819 | B1 | | 6/2003 | Oshima et al. | |
| 7,136,415 | B2 | * | 11/2006 | Yun et al. ................. | 375/240.26 |
| 7,859,529 | B2 | * | 12/2010 | Tokumo et al. ............... | 345/419 |
| 7,903,737 | B2 | * | 3/2011 | Martinian et al. ....... | 375/240.12 |
| 2006/0125917 | A1 | * | 6/2006 | Cha et al. ......................... | 348/51 |
| 2006/0204238 | A1 | | 9/2006 | Suzuki | |
| 2007/0030342 | A1 | * | 2/2007 | Wilburn et al. ................ | 348/47 |
| 2007/0198546 | A1 | | 8/2007 | Shintani | |
| 2008/0192110 | A1 | * | 8/2008 | Grover ............................ | 348/47 |
| 2008/0273082 | A1 | * | 11/2008 | Miyake .......................... | 348/47 |

(Continued)

FOREIGN PATENT DOCUMENTS

| | | |
|---|---|---|
| CN | 1832537 A | 9/2006 |
| JP | 62-226351 A | 10/1987 |

(Continued)

*Primary Examiner* — Michael Won
(74) *Attorney, Agent, or Firm* — Birch, Stewart, Kolasch & Birch, LLP

(57) ABSTRACT

To prevent information required for reproducing of a 3D/multi-viewpoint image being lost even in a case in which editing or the like of the 3D/multi-viewpoint image is performed using a device or application software that does not support 3D/multi-viewpoint images, a compound-eye digital camera can switch between a multi-viewpoint image taking mode that images a subject image viewed from a plurality of viewpoints and a single viewpoint image taking mode that takes a subject image viewed from a single viewpoint. When taking an image in the multi-viewpoint image taking mode, the compound-eye digital camera sets a protect flag for multi-viewpoint images acquired with an image pickup device and records the multi-viewpoint images. As a result, the taken multi-viewpoint images are protected, and erasure or editing of the images cannot be performed without permission.

16 Claims, 7 Drawing Sheets

U.S. PATENT DOCUMENTS

2008/0316300 A1 * 12/2008 Okamoto ................. 348/47
2009/0273663 A1    11/2009 Yoshida

FOREIGN PATENT DOCUMENTS

| | | |
|---|---|---|
| JP | 05-030638 A | 2/1993 |
| JP | 06-148764 A | 5/1994 |
| JP | 8-140116 A | 5/1996 |
| JP | 10-224820 A | 8/1998 |
| JP | 11-308563 A | 11/1999 |
| JP | 2000-115685 A | 4/2000 |
| JP | 2000-209535 A | 7/2000 |
| JP | 2001-016616 A | 1/2001 |
| JP | 2004-166160 A | 6/2004 |
| JP | 2004-274253 A | 9/2004 |
| JP | 2004-297540 A | 10/2004 |
| JP | 2005-077253 A | 3/2005 |
| JP | 2006-41699 A | 2/2006 |
| JP | 2006-309745 A | 11/2006 |
| JP | 2008-172735 A | 7/2008 |
| JP | 2010-22067 A | 1/2010 |
| WO | WO 2007/001056 A1 | 1/2007 |

* cited by examiner

IMAGE TAKING APPARATUS, IMAGE REPRODUCING APPARATUS, IMAGE TAKING METHOD AND PROGRAM

This application is a Continuation of application Ser. No. 12/123,894 filed on May 20, 2008, which has now been patented, U.S. Pat. No. 8,072,485, and for which priority is claimed under 35 U.S.C. §120; and this application claims priority of Application No. 2007-134267 filed in Japan on May 21, 2007 under 35 U.S.C. §119; the entire contents of all are hereby incorporated by reference.

BACKGROUND OF THE INVENTION

1. Field of the Invention

The present invention relates to an image taking apparatus, an image reproducing device, an image taking method, and a program, and more particularly to an image taking apparatus, an image reproducing device, an image taking method, and a program that prevent erroneous erasure or the like of recorded images.

2. Description of the Related Art

The following technologies have been proposed as technologies for preventing erroneous erasure or editing of images that are recorded with an image taking apparatus such as a digital camera.

Japanese Patent Application Laid-Open No. 2006-41699 discloses technology that, when performing image taking, automatically protects against erasure of captured images by protecting against erasure of a previously captured image before recording.

Japanese Patent Application Laid-Open No. 2000-115685 discloses technology that prevents a captured moving image being erased by an erroneous operation that deletes the base data or the like after edited data is written.

Japanese Patent Application Laid-Open No. 2000-209535 discloses technology that, in a standard mode, prevent loss of important images by inhibiting overwriting of the same file inside the same folder and inhibiting an operation to delete image data.

Japanese Patent Application Laid-Open No. 11-308563 discloses technology that prevents erasure of or a decrease in the image quality of a required image by executing protection that inhibits a change in a compression ratio with respect to compressed image data for which the user does not want to change the compression ratio.

SUMMARY OF THE INVENTION

In a case in which standards relating to 3D (three-dimensional)/multi-viewpoint images are decided, when a 3D/multi-viewpoint image is edited and stored using a device or an application software that does not support the 3D/multi-viewpoint image standards as described in Japanese Patent Application Laid-Open Nos. 2006-41699, 2000-115685 and 11-308563, the following problem may remain.

In order to ensure compatibility between 3D standards and the conventional standards, an image from a representative viewpoint in a 3D/multi-viewpoint image is recorded first, and thereafter a newly introduced tag (3D/multi-viewpoint tag) and a 3D/multi-viewpoint image according to a format in which the images of the remaining viewpoints are recorded, are recorded in a memory or the like. At this time, when the file of the 3D/multi-viewpoint image is read with a device or an application software that does not support 3D/multi-viewpoint images, the data that follows the 3D/multi-viewpoint tag is not recognized and cannot be read. When editing including resizing or rotation is performed in this state and the post-editing image is re-recorded, data required to reproduce the 3D/multi-viewpoint image is discarded.

The present invention has been made in consideration of the above circumstances, and an object of the invention is to prevent erasure of information required for reproducing of a 3D/multi-viewpoint image also in a case in which editing of a 3D/multi-viewpoint image is performed with a device or an application software that does not support 3D/multi-viewpoint images.

An image taking apparatus according to a first aspect of the present invention comprises an image taking mode switching device which switches between a multi-viewpoint image taking mode that takes a subject image that is viewed from a plurality of viewpoints and a single viewpoint image taking mode that takes a subject image that is viewed from a single viewpoint; an image taking mode detection device which detects an image taking mode that is switched to by the image taking mode switching device; an image pickup device which acquires a multi-viewpoint image or a single viewpoint image that is taken in an image taking mode that is switched to by the image taking mode switching device; a recording device which records a multi-viewpoint image or a single viewpoint image acquired with the image pickup device on a recording medium; and a protection setting device which, in a case where the multi-viewpoint image taking mode is detected by the image taking mode detection device, sets a protection with respect to a multi-viewpoint image that is recorded by the recording device so that the multi-viewpoint image is not changed or deleted.

According to the image taking apparatus of the first aspect, when taking a multi-viewpoint image in which a subject image that is viewed from a plurality of viewpoints is taken, a protection setting is set for a multi-viewpoint image recorded on the recording device so that the multi-viewpoint image is not changed or deleted. For example, in the case of a multi-viewpoint image, this is performed by a recording method that sets an access flag of an image file to "write inhibit" or "read only" or the like, or a method that changes the attributes of an image file by allocating a write inhibit attribute or a read only attribute or the like to the image file. In this connection, the protection setting is performed by writing the above information in tag information that is attached to the image. Thus, since recording is carried out in a state in which protection is applied to the acquired multi-viewpoint image, even in a case in which editing or the like is performed using a device or an application software that does not support 3D/multi-viewpoint images, it is possible to prevent erasure of information that is required for playing back the 3D/multi-viewpoint image.

An image taking apparatus according to a second aspect of the present invention is in accordance with the image taking apparatus of the first aspect, wherein the image pickup device comprises a plurality of imaging systems having a plurality of optical systems and image pickup elements that form a subject image; a driving device which drives the plurality of imaging systems in a case in which the multi-viewpoint image taking mode is switched to by the image taking mode switching device and which drives a single imaging system in a case in which the single viewpoint image taking mode is switched to by the image taking mode switching device; and a drive detection device that detects whether or not driving of the imaging system by the driving device is completed; wherein, in a case in which the multi-viewpoint image taking mode is detected by the image taking mode detection device and the drive detection device detects that the plurality of imaging systems are not driving, the image taking mode switching device switches from the multi-viewpoint image taking mode to the single viewpoint image taking mode.

According to the image taking apparatus of the second aspect, when a plurality of imaging systems are not driving in a case in which the multi-viewpoint image taking mode is set, that is, when a multi-viewpoint image cannot be taken, the image taking apparatus switches from the multi-viewpoint image taking mode to the single viewpoint image taking mode. As a result, when a multi-viewpoint image cannot be taken, a two-dimensional image is automatically taken and a setting can be made so as not to protect the captured image.

An image taking apparatus according to a third aspect of the present invention is in accordance with the image taking apparatus of the first or second aspect, further comprising a vertical shooting detection device which detects whether the image taking apparatus is in a state that vertically shoots a subject image, wherein, in a case in which the multi-viewpoint image taking mode is switched to by the image taking mode switching device and the vertical shooting detection device detects that the image taking apparatus is in a state that vertically shoots a subject image, the image taking mode switching device switches from the multi-viewpoint image taking mode to the single viewpoint image taking mode.

According to the image taking apparatus of the third aspect, in a case where the multi-viewpoint image taking mode is set, when the image taking apparatus is in a state that vertically shoots a subject image, i.e. when a multi-viewpoint image cannot be taken, the image taking apparatus switches from a multi-viewpoint image taking mode to a single viewpoint image taking mode. As a result, when a multi-viewpoint image cannot be taken, a setting can be made to automatically capture a two-dimensional image and not protect the captured image.

An image taking apparatus according to a fourth aspect of the present invention is in accordance with the image taking apparatus according to any of the first to third aspects, further comprising an erase mode setting device which, in a case where images including the multi-viewpoint image are recorded in the recording device, sets an erase mode that erases a desired image that is selected from among the images; an erase mode detection device which detects whether or not the erase mode is set; a warning device which, when the desired image is the multi-viewpoint image in a case where the erase mode is detected by the erase mode detection device, issues a warning to the effect that the multi-viewpoint image is to be erased; and an erasing device which, in a case where selection of the multi-viewpoint image is confirmed after a warning is issued by the warning device, cancels the protection that is set for the selected multi-viewpoint image and erases the multi-viewpoint image.

According to the image taking apparatus of the fourth aspect, a warning is issued when a multi-viewpoint image is selected in an erase mode which erases a desired image that is selected from among images including a multi-viewpoint image that are recorded using a recording device. When selection of the multi-viewpoint image is confirmed after the warning, protection of the multi-viewpoint image is cancelled and the image is erased. As a result, since a warning is issued before erasing a multi-viewpoint image, it is possible to prevent a user erroneously erasing a multi-viewpoint image. For example, by assigning a read protection setting to a multi-viewpoint image using a protect flag, the user can edit the image after taking care to copy the 3D/multi-viewpoint image using a different file name.

An image taking apparatus according to a fifth aspect of the present invention is in accordance with the image taking apparatus according to any of the first to fourth aspects, further comprising an edit mode setting device which, in a case where images including the multi-viewpoint image are recorded in the recording device, sets an edit mode that edits a desired image that is selected from among the images; an edit mode detection device that detects whether or not the edit mode is set; a warning device which, when the desired image is the multi-viewpoint image in a case where the edit mode is detected by the edit mode detection device, issues a warning to the effect that the multi-viewpoint image is to be edited; a protection canceling device which, in a case where selection of the multi-viewpoint image is confirmed after a warning is issued by the warning device, cancels the protection that is set for the selected multi-viewpoint image; and an editing device which edits a multi-viewpoint image for which a protection is cancelled by the protection canceling device; wherein the recording device records a multi-viewpoint image that is edited by the editing device on a recording medium, and the protection setting device sets a protection with respect to the edited multi-viewpoint image that is recorded by the recording device so that the multi-viewpoint image is not changed or deleted.

According to the image taking apparatus of the fifth aspect, a warning is issued when a multi-viewpoint image is selected in an edit mode which edits a desired image that is selected from among images including a multi-viewpoint image that are recorded using a recording device. When selection of the multi-viewpoint image is confirmed after the warning, protection of the multi-viewpoint image is cancelled and the image is edited. The image taking apparatus records an edited multi-viewpoint image on a recording device and sets a protection so that the multi-viewpoint image is not changed or deleted. As a result, since a warning is issued before executing editing of a multi-viewpoint image, it is possible to prevent a user erroneously editing a multi-viewpoint image. Further, since an edited image is protected, it is possible to appropriately safeguard the edited image.

An image taking apparatus according to a sixth aspect of the present invention is in accordance with the image taking apparatus of the fifth aspect, wherein the recording device records a multi-viewpoint image that is edited with the editing device on the recording device after issuing a warning again.

According to the image taking apparatus of the sixth aspect, a warning is issued again before recording an edited multi-viewpoint image on a recording device. As a result, in a case where a multi-viewpoint image is edited, it is possible to prevent the user from erroneously saving the edited image.

An image reproducing apparatus according to a seventh aspect of the present invention comprises a connection device to which a recording medium than can record a subject image is connected; a detection device that detects that the recording medium is connected to the connection device; a first judgment device which, in a case where connection of the recording medium is detected by the detection device, judges whether or not a multi-viewpoint image that is a subject image that is viewed from a plurality of viewpoints is recorded on the recording medium; a first protection setting device which, in a case where the first judgment device judges that the multi-viewpoint image is recorded, sets a protection with respect to the recorded multi-viewpoint image so that the multi-viewpoint image is not changed or deleted.

According to the image reproducing apparatus of the seventh aspect, in a case where a multi-viewpoint image is recorded on the recording medium when a recording medium than can record a subject image is connected, the image reproducing apparatus sets a protection with respect to the recorded multi-viewpoint image so that the multi-viewpoint image is not changed or deleted. It is therefore possible to automatically protect a multi-viewpoint image that is taken with a device that does not automatically protect a 3D/multi-viewpoint image.

An image reproducing apparatus according to an eighth aspect of the present invention is in accordance with the image reproducing apparatus of the seventh aspect, further comprising a second judgment device which, when the detection device detects that the recording medium is connected, judges whether or not a new subject image can be recorded on the recording medium; and a second protection setting device which, when the second judgment device judges that a new subject image cannot be recorded on the recording medium, sets a protection with respect to the recording medium so that a multi-viewpoint image or a single viewpoint image that is recorded on the recording medium is not changed or deleted.

According to the image reproducing apparatus of the eighth aspect, when a new subject image cannot be recorded on a connected recording medium, the image reproducing apparatus sets a protection with respect to the recording medium so that data such as a multi-viewpoint image or a single viewpoint image that is recorded on the recording medium is not changed or deleted. Since it is thereby possible to provide double protection for a multi-viewpoint image included in a recording medium, safeguarding of image data can be further enhanced.

An image taking apparatus according to a ninth aspect of the present invention is in accordance with an image taking apparatus according to any one of the first to sixth aspects, further comprising an image reproducing apparatus according to the seventh or eighth aspect.

An image taking method according to a tenth aspect of the present invention comprises a step of switching between a multi-viewpoint image taking mode that takes a subject image that is viewed from a plurality of viewpoints and a single viewpoint image taking mode that takes a subject image that is viewed from a single viewpoint; a step of detecting the image taking mode that is switched to; a step of acquiring a multi-viewpoint image or a single viewpoint image that is taken in the image taking mode that is switched to; a step of recording the multi-viewpoint image or single viewpoint image that is acquired on a recording medium; and a step of, in a case where the multi-viewpoint image taking mode is detected in the step of detecting the image taking mode, setting a protection setting with respect to the recorded multi-viewpoint image so that the multi-viewpoint image is not changed or deleted.

An image taking method according to an eleventh aspect of the present invention comprises a step in which a recording medium that can record a subject image is connected; a step of detecting that the recording medium is connected; a step of, in a case in which connection of the recording medium is detected, judging whether or not a multi-viewpoint image that is a subject image that is viewed from a plurality of viewpoints is recorded on the recording medium; and when it is judged that the multi-viewpoint image is recorded in the step of judging whether or not the multi-viewpoint image is recorded on the recording medium, a step of setting a protection setting with respect to the recorded multi-viewpoint image so that the multi-viewpoint image is not changed or deleted.

A program according to a twelfth aspect causes an arithmetic and logic unit to execute an image taking method according to the tenth or eleventh aspect.

According to the present invention, even when performing editing or the like of a 3D/multi-viewpoint image with a device or an application software that does not support 3D/multi-viewpoint images, it is possible to prevent erasure of information necessary for playing back a 3D/multi-viewpoint image.

DETAILED DESCRIPTION OF THE PREFERRED EMBODIMENTS

Hereunder, preferred embodiments for implementing a changeable-lens type digital camera with integrated image pickup element according to the present invention are described in detail in accordance with the attached drawings.

Figure 1:
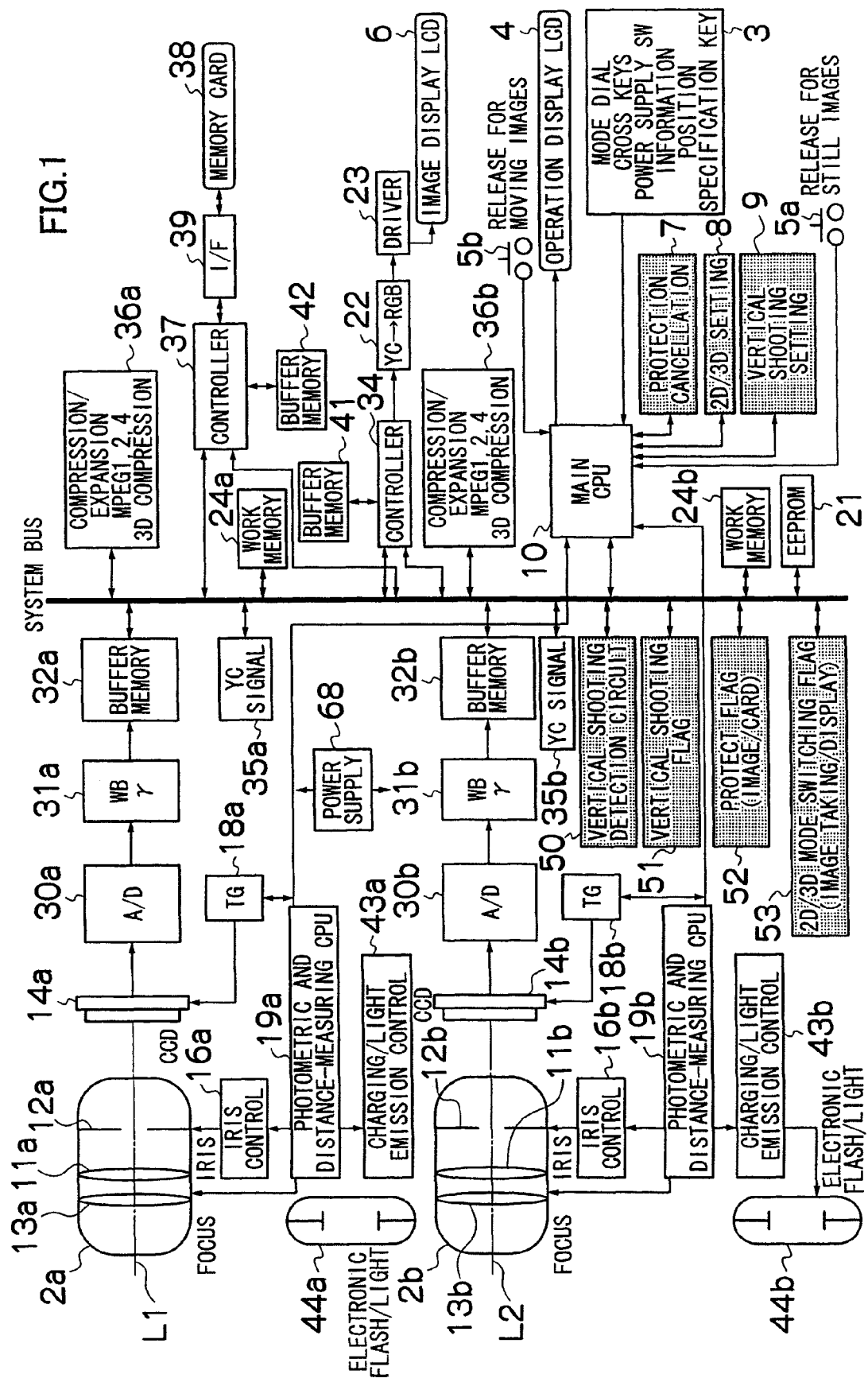
FIG. 1 is a block diagram of a compound-eye digital camera 1a to which the present invention is applied.

FIG. 1 is a block diagram that shows the electrical configuration of a compound-eye digital camera 1. The compound-eye digital camera 1 is capable of taking a single viewpoint image (two-dimensional image) and a multi-viewpoint image (three-dimensional image), and is also capable of recording and reproducing of moving images, still images, and sounds. Further, taking of a multi-viewpoint image, and not just a single viewpoint image, is also possible for both moving images and still images.

The compound-eye digital camera 1 principally includes two imaging systems constituted by a first imaging system 2a and a second imaging system 2b, an operation portion 3 that allows a user to perform various operations when using the compound-eye digital camera 1, an operation display LCD 4 for providing assistance with operations, release switches 5a and 5b, and an image display LCD 6.

The first imaging system 2a and the second imaging system 2b are arranged in parallel so that lens optical axes L1 and L2 thereof are parallel or form a predetermined angle.

The first imaging system 2a is configured by a first zoom lens 11a that is arranged along the lens optical axis L1, a first iris 12a, a first focus lens 13a, and a first image sensor 14a. An iris control portion 16a is connected to the first iris 12a, and a timing generator (TG) 18a is connected to the first image sensor 14a. Operations of the first focus lens 13a and the first iris 12a are controlled by a photometric and distance-measuring CPU 19a. Operations of the TG 18a are controlled by a main CPU 10.

In accordance with a zoom operation from the operation portion 3, the first zoom lens 11a changes the zoom magnification ratio by moving along the lens optical axis L1 to a NEAR side (extended side) or an INF side (a retracted side). This movement is driven by an unshown motor.

The first iris 12a changes an opening value (aperture value) at a time of an AE (Auto Exposure) operation to restrict a luminous flux and adjust the exposure.

The first focus lens 13a performs focus adjustment by moving to the NEAR side or the INF side along the lens optical axis L1 at the time of an AF (Auto Focus) operation to change the focus position. This movement is driven by an unshown motor. When a half-pressed state of the release switch 5a for still images is detected, the main CPU 10 obtains range data from the first image sensor 14a. Based on the obtained range data, the main CPU 10 adjusts the focus and iris and the like.

The first image sensor 14a is a CCD or CMOS type image sensor that receives light of a subject which is subjected to image formation by the first zoom lens 11a, the first iris 12a, and the first focus lens 13a, and stores a photo-electric charge that corresponds to the amount of received light at a light receiving element. A photo-electric charge storage and transfer operation of the first image sensor 14a is controlled by the TG 18a. An electronic shutter speed (photo-electric charge storage time) is determined by a timing signal (clock pulse) that is input from the TG 18a. When in an image taking mode, the first image sensor 14a acquires an image signal for one frame at each predetermined period.

The second imaging system 2b has the same configuration as the first imaging system 2a, and is configured by a second zoom lens 11b, a second iris 12b, a second focus lens 13b, and a second image sensor 14b to which a timing generator (TG) 18b is connected.

Operations of the first imaging system 2a and the second imaging system 2b are controlled by the main CPU 10. Although the first imaging system 2a and the second imaging system 2b basically perform operations in response to each other, it is also possible for the first imaging system 2a and the second imaging system 2b to be operated independently from each other.

Imaging signals output from the first image sensor 14a and the second image sensor 14b of the first imaging system 2a and the second imaging system 2b are input to A/D converters 30a and 30b, respectively.

The A/D converters 30a and 30b convert the input image data from analog to digital data. The imaging signals of the first image sensor 14a are output as first image data (image data for right eye) and the imaging signals of the second image sensor 14b are output as second image data (image data for left eye) via the A/D converters 30a and 30b.

Image signal processing circuits 31a and 31b respectively subject the first image data and the second image data input from the A/D converters 30a and 30b to various kinds of image processing such as gradation conversion, white balance correction, and γ-correction processing.

Buffer memories 32a and 32b temporarily store first image data and second image data that undergo various kinds of image processing at the image signal processing circuits 31a and 31b. The first image data and the second image data that are stored in the buffer memories 32a and 32b are output via a system bus.

The main CPU 10, an EEPROM 21, work memories 24a and 24b, buffer memories 32a and 32b, a controller 34, YC processing portions 35a and 35b, compression/expansion processing circuits 36a and 36b, a media controller 37, a vertical shooting detection circuit 50, a vertical shooting flag setting circuit 51, a protect flag setting circuit 52, and a 2D/3D mode switching flag setting circuit 53 are connected to the system bus.

The main CPU 10 performs unified control of the overall operations of the compound-eye digital camera 1. The operation portion 3, release switches 5a and 5b, a protection cancellation switch 7, a 2D/3D setting switch 8, and a vertical shooting setting button 9 are connected to the main CPU 10.

The operation portion 3 comprises a power switch for turning on the power to operate the compound-eye digital camera 1, a mode dial for selecting automatic exposure or manual exposure or the like, cross keys for setting or selecting various menus or for performing a zoom operation, a switch for emitting a flash light, and an information position specification key for executing or cancelling a menu that is selected with the cross keys. By performing an appropriate operation at the operation portion 3, operations such as turning the power on or off, switching to various modes (image taking mode, reproducing mode, erase mode, edit mode and the like), and zooming can be performed.

The release switches 5a and 5b have a two-stage switch configuration. When the release switch 5a or 5b is lightly pressed (semi-depressed) when in the image taking mode, an AF operation and an AE operation are performed as image taking preparation processing. When the release switches 5a, 5b are pressed strongly (fully depressed) in this state, exposure processing is performed and first image data and second image data for one frame are transferred from a frame memory 32 to a memory card 38 and recorded.

An image display LCD 6 is a 3D monitor according to a parallax barrier system or a lenticular lens system. The image display LCD 6 is used as an electronic view finder at a time of image exposure. At a time of image reproducing, the image display LCD 6 performs stereoscopic display of image data obtained by image taking. Although the detailed structure of the image display LCD 6 is not illustrated, the image display LCD 6 comprises a parallax barrier display layer on the surface thereof. When performing a stereoscopic display, the image display LCD 6 generates a parallax barrier comprising a pattern in which a light transmitting portion and a light blocking portion are alternately aligned at a predetermined pitch on the parallax barrier display layer, and enables stereoscopic views by alternately arranging and displaying strip-shaped image fragments that show left and right images on an image display screen on a lower layer thereof. In this connection, there is no necessity to limit the configuration of a display device that enable stereoscopic views to a parallax system using a slit array sheet, and a lenticular system using a lenticular lens sheet, an integral photography system using a micro-lens array sheet, and a holography system using an interference phenomenon may also be employed.

The protection cancellation switch 7 is a switch for specifying release of protection of an image for which erasure, editing, or the like is inhibited.

A 2D/3D setting switch 8 is a switch for specifying switching between a 2D mode that captures a single viewpoint image and a 3D mode that captures a multi-viewpoint image.

A vertical shooting setting button 9 is a button for specifying whether to perform image taking using either vertical shooting or horizontal shooting. In this connection, a configuration may be adopted in which selection of vertical shooting/horizontal shooting is performed by making a menu selection.

An EEPROM 21 is a non-volatile memory that stores setting information or programs for various kinds of control and the like. The main CPU 10 executes various kinds of processing based on the programs or setting information.

Work memories 24a and 24b respectively store YC signals that are processed at the YC processing portions 35a and 35b.

A controller 34 reads out YC signals of first image data and second image data stored in the work memories 24a and 24b to the YC/RGB processing portion 22.

The YC/RGB processing portion 22 converts YC signals of the first image data and the second image data into video signals of a predetermined format (for example, a composite color video signal in NTSC format), and then synthesizes the video signals with stereoscopic image data for performing a stereoscopic display on the image display LCD 6 and outputs the resulting data to a LCD driver for display 23. When the image display LCD 6 is used as an electronic view finder in an image taking mode, stereoscopic image data that is synthesized by the YC/RGB processing portion 22 is displayed as a through image on the image display LCD 6 via an LCD driver 23. Further, when performing a stereoscopic display of image data obtained by image taking, the YC/RGB processing portion 22 reads out the respective image data that is recorded on the memory card 38 using the media controller 37, converts data that is subjected to expansion processing by the compression/expansion processing circuits 36a and 36b into stereoscopic image data, and displays that stereoscopic image data on the image display LCD 6 as a reproduced image via the LCD driver 23.

The LCD driver 23 outputs RGB signals output from the YC/RGB processing portion 22 to the image display LCD 6.

YC processing portions 35a and 35b converts image data stored in the buffer memories 32a and 32b into luminance signals (Y signals) and color-difference signals (Cr an Cb signals), and also performs predetermined processing such as gamma correction.

Compression/expansion processing circuits 36a and 36b perform compression/expansion processing on first image data and second image data stored in the respective work memories 24a and 24b, in accordance with predetermined compression/expansion formats such as JPEG for still images and MPEG2, MPEG4, or H.264 format for moving images.

A media controller 37 records each image data that undergoes compression/expansion processing by the compression/expansion processing circuits 36a and 36b on a memory card 38 that is connected via an I/F 39, or other recording media.

The memory card 38 may be various recording media that can be removably inserted into the compound-eye digital camera 1 such as an XD picture card (registered trademark), a semi-conductor memory card represented by smart media (registered trademark), a portable small-sized hard disk, a magnetic disc, an optical disk, or a magneto-optical disk.

A vertical shooting detection circuit 50 detects whether to perform image taking using vertical shooting or horizontal shooting, using a sensor that utilizes gravity or a sensor utilizing a Hall device or MEMS or the like.

A vertical shooting flag setting circuit 51 sets a flag indicating that the compound-eye digital camera 1 is in vertical shooting mode.

A protect flag setting circuit 52 sets an erase inhibit flag, an edit inhibit flag, an overwrite inhibit flag and the like. Normally, if there is an erase inhibit flag, erasure, overwriting and editing can be inhibited. By adopting a configuration in which, in addition to an erase inhibit flag, an edit inhibit flag and an overwrite inhibit flag can be individually provided and set. In that case, it is possible to inhibit editing, and when editing is to be performed, a file that is copied under a different name can be edited. At this time, by making a setting that enables erasure even when editing is inhibited, it is possible to facilitate an erasure operation as long as the contents of a file can be ascertained.

A flag representing whether a mode is a 2D mode or a 3D mode is set in a 2D/3D mode switching flag setting circuit 53. In this connection, a configuration may be adopted in which erasure, editing, overwriting and the like can all be inhibited with one flag, and not just a configuration in which an edit inhibit flag, an overwrite inhibit flag or the like is individually provided as a protect flag.

The vertical shooting flag, the protect flag, and the 2D/3D mode switching flag are written in tag information that is attached to an acquired image file, a folder, or the memory card 38 or the like.

A power supply battery 68 is detachably mounted in the compound-eye digital camera 1.

The power supply battery 68 comprises a chargeable secondary battery, for example, a nickel-cadmium battery, a nickel hydrogen battery, or a lithium ion battery. The power supply battery 68 may also comprise a throwaway primary battery, for example, a lithium battery or an alkaline battery. By loading the power supply battery 68 in an unshown battery storage chamber, the power supply battery 68 is electrically connected with each circuit of the compound-eye digital camera 1.

Charging and light emission control portions 43a and 43b receive a supply of electric power from the power supply battery 68 and, in order to cause electronic flashes 44a and 44b to emit light, respectively, charge an unshown capacitor for emitting a flash light and control light emission of the electronic flashes 44a and 44b.

In accordance with various signals such as semi-depression and full depression operation signals of the release switches 5a and 5b and signals indicating a light emission amount and light emission timing that are incorporated from the main CPU 10 or photometric and distance-measuring CPUs 19a and 19b, the charging and light emission control portions 43a and 43b perform current supply control to the electronic flashes 44a and 44b and execute control so that the desired light emission amount is obtained at the desired timing.

Although according to the compound-eye digital camera 1 shown in FIG. 1 an example is illustrated that has two imaging systems (first imaging system 2a and second imaging system 2b), three or more imaging systems may be included. Further, the imaging systems need not be disposed in a single horizontal row, and may be disposed two-dimensionally.

Further, instead of providing a release button for each imaging system as in the above described compound-eye digital camera 1, only one release button may be provided.

The compound-eye digital camera 1 shown in FIG. 1 is capable of not only stereoscopic image taking, but also image taking from multiple aspects or from all directions.

Image taking, recording operations, and reproducing operations of the compound-eye digital camera 1 configured as described above will now be described.

In the compound-eye digital camera 1, when a power supply button (not shown) is turned on, the main CPU 10 detects that the power supply button is on and turns on the power supply inside the camera to put the camera in an image taking standby state in image taking mode. Further, the user sets either the 2D mode or the 3D mode using the 2D/3D setting switch 8. As necessary, the user depresses the vertical shooting setting button 9 to set vertical shooting.

In this image-taking standby state, the main CPU 10 normally displays a moving image (through image) on the image display LCD 6.

First, the main CPU 10 refers to the 2D/3D mode switching flag setting circuit 53 to detect either the 2D mode that acquires a single viewpoint image (two-dimensional image) or the 3D mode that acquires a multi-viewpoint image (three-dimensional image). For the 2D mode the main CPU 10 drives only the first imaging system 2a, and for the 3D mode the main CPU 10 drives the first imaging system 2a and the second imaging system 2*b*. Hereunder, a description is given taking the 3D mode as an example.

The first zoom lens 11*a*, the second zoom lens 11*b*, the first focus lens 13*a*, and the second focus lens 13*b* are extended as far as a predetermined position, and thereafter image taking for a through image is performed by the first image sensor 14*a* and the second image sensor 14*b* to display a through image on the image display LCD 6. That is, images are continuously captured by the first image sensor 14*a* and the second image sensor 14*b*, and the image signals thereof are continuously processed to generate image data for a through image. The generated image data is sequentially applied to the controller 34 and converted into a signal format for display, and then output to the image display LCD 6. Thus, the images captured by the first image sensor 14*a* and the second image sensor 14*b* are displayed in a through condition on the image display LCD 6.

A user (photographer) performs framing, checks the subject to be taken, checks the image after image taking, and sets image taking conditions and the like while viewing the through images displayed on the image display LCD 6.

When the release switches 5*a* and 5*b* are semi-depressed in the above described image taking standby state, an S1 ON signal is input to the main CPU 10. The main CPU 10 detects that signal and performs AE photometry and AF control. At the time of AE photometry, the main CPU 10 performs photometry with respect to the brightness of the subject based on integrated values of image signal that are incorporated through the first image sensor 14*a* and the second image sensor 14*b* and the like. The value obtained by this photometry (photometric value) is used to decide the aperture value of the first iris 12*a* and second iris 12*b* and the shutter speed at the time of the actual image taking. At the same time, the main CPU 10 determines whether or not luminescence of the electronic flashes is required based on the detected subject brightness. When the main CPU 10 determines that light emission of the electronic flashes 44*a* and 44*b* is required, the main CPU 10 causes the electronic flashes 44*a* and 44*b* to perform a preliminary light emission. The main CPU 10 decides the light emission amounts of the electronic flashes 44*a* and 44*b* at the time of actual image taking based on the reflected light from the preliminary light emission. The main CPU 10 also determines whether vertical shooting or horizontal shooting is to be performed using the vertical shooting detection circuit 50.

When the release switches 5*a* and 5*b* are depressed fully, an S2 ON signal is input to the main CPU 10. In response to the S2 ON signal, the main CPU 10 executes image taking and recording processing.

First, the main CPU 10 drives the first iris 12*a* and the second iris 12*b* via the iris control portions 16*a* and 16*b* based on aperture values that are determined based on the aforementioned photometric value, and also controls a charge storage time (the so-called electronic shutter) at the first image sensor 14*a* and the second image sensor 14*b* to attain the shutter speed that is determined based on the photometric value.

Further, the main CPU 10 calculates AF evaluation values and AE evaluation values based on the first image data and the second image data, respectively, that are stored in the buffer memories 32*a* and 32*b*. The AF evaluation values are calculated by integrating high frequency components of luminance values for the entire area or a predetermined region (for example, the center part) of each piece of image data, and represent the sharpness of the image. The term "high frequency component of a luminance value" refers to a value obtained by totaling luminance differences (contrasts) between adjoining pixels within a predetermined region. The AE evaluation value is calculated by integrating luminance values for the entire region or a predetermined region (for example, the center part) of each piece of image data, and represents the brightness of an image. The AF evaluation values and the AE evaluation values are respectively used for an AF operation and an AE operation that are executed at the time of image-taking preparation processing described hereunder.

The main CPU 10 performs an AF operation (contrast AF) by determining the maximum value of AF evaluation values that are calculated based on each of the first image data and the second image data that are sequentially obtained while the main CPU 10 controls the first focus lens 13*a* and the second focus lens 13*b* to move the first focus lens 13*a* and the second focus lens 13*b* in a predetermined direction, respectively.

At this time, when causing the electronic flashes 44*a* and 44*b* to emit light, the main CPU 10 causes the electronic flashes 44*a* and 44*b* to emit light based on the light emission amount of the electronic flashes 44*a* and 44*b* determined based on the results of preliminary-light emission.

The subject light is incident on a light receiving surface of the first image sensor 14*a* via the first zoom lens 11*a*, the first iris 12*a*, and the first focus lens 13*a*. The subject light is also incident on a light receiving surface of the second image sensor 14*b* via the second zoom lens 11*b*, the second iris 12*b*, and the second focus lens 13*b*.

The first image sensor 14*a* and the second image sensor 14*b* comprise a color CCD in which color filters for R, G, and B of a predetermined color filter array (for example, a honeycomb array or a Bayer array) are provided. Light that is incident on a light receiving surface of the first image sensor 14*a* and the second image sensor 14*b* is converted into a signal charge of an amount that corresponds to the amount of incident light by each photodiode arranged on the light receiving surface. Signal charges that are accumulated at the respective photodiodes are read out in accordance with a timing signal that is applied from the timing generator (TG) 18*a*, output sequentially from the first image sensor 14*a* and the second image sensor 14*b* as voltage signals (image signals), and input to the A/D converters 30*a* and 30*b*.

The A/D converters 30*a* and 30*b* include a CDS circuit and an analog amplifier. The CDS circuit performs correlated double sampling processing of a CCD output signal based on a CDS pulse. The analog amplifier amplifies an image signal output from a CDS circuit using a gain for setting imaging sensitivity that is applied from the main CPU 10. At the A/D converters 30*a* and 30*b*, the respective analog image signals are converted into digital image signals.

The first image data and the second image data output from the A/D converters 30*a* and 30*b* are subjected to various kinds of image processing such as gradation conversion, white balance correction, γ-correction processing at the image signal processing circuits 31*a* and 31*b*, respectively, and then temporarily stored in the buffer memories 32*a* and 32*b*.

R, G, and B image signals read out from the buffer memories 32*a* and 32*b* are converted to a luminance signal Y and color-difference signals Cr and Cb (YC signals) by the YC processing portions 35*a* and 35*b*. The Y signal is subjected to edge enhancement processing by an edge correction circuit. The YC signals processed at the YC processing portions 35*a* and 35*b* are stored in the respective work memories 24*a* and 24*b*.

The YC signals stored in the buffer memories 32*a* and 32*b* in the manner described above are compressed by the compression/expansion processing circuits 36*a* and 36*b* and recorded in the memory card 38 as an image file of a predetermined format via the I/F 39. In the case of the compound-eye digital camera 1 according to the present example, the data of a two-dimensional image that is a still image is stored in the memory card 38 as an image file in accordance with Exif standards. An Exif file has a region that stores data of a main image and a region that stores data of a reduced image (thumbnail image). A thumbnail image of a prescribed size (for example, 160×120 or 80×60 pixels or the like) is generated by performing pixel thinning processing based on data on the main image that is acquired by image taking and other necessary data processing. The thumbnail image generated in this manner is written inside the Exif file together with the main image. Further, tag information such as the image taking data and time, image taking conditions, face detection information and the like is attached to the Exif file. Data of a moving image is stored in the memory card 38 after undergoing compression and expansion processing according to a predetermined compression and expansion format such as MPEG2, MPEG4, or H.264 format.

When recording image data of a three-dimensional image in the memory card 38, the protect flag setting circuit 52 writes the protect flag into tag information that is attached to the image data. Image data that is written by the protect flag setting circuit 52 or the like is stored in the memory card 38 as an image file for which protection is set (described in detail later). Further, when vertical shooting is detected with the vertical shooting detection circuit 50, the vertical shooting flag setting circuit 51 writes the vertical shooting flag into tag information that is attached to the image data. In this connection, when image taking is performed in the 2D mode, the protect flag is not set.

Image data that is recorded in the memory card 38 in this manner is reproduced and displayed on the image display LCD 6 by setting the mode of the compound-eye digital camera 1 to reproducing mode. Switching over to reproducing mode is performed by depressing a reproducing button (not shown).

When the reproducing mode is selected, the image file of a final frame recorded on the memory card 38 is read out through the I/F 39. The compressed data of the image file that is read out is expanded into uncompressed YC signals through the compression/expansion processing circuits 36a and 36b.

The expanded YC signals are held in buffer memories 32a and 32b (or an unshown VRAM), converted into a signal format for display by the controller 34, and output to the image display LCD 6. As a result, the image of the final frame recorded in the memory card 38 is displayed on the image display LCD 6.

Thereafter, when a forward frame feeding switch (right-side key of cross keys) is pressed, frames are fed in the forward direction, and when a reverse frame feeding switch (left-side key of cross keys) is pressed, frames are fed in the reverse direction. The image file at the frame position to which the frame is fed is then read out from the memory card 38, and the image is played back on the image display LCD 6 in the same manner as described above.

As necessary, a user can erase an image recorded on the memory card 38 while checking the image that is reproduced and displayed on the image display LCD 6. Erasure of an image is performed by pressing a photo mode button in a state in which the image is played back and displayed on the image display LCD 6. A detailed description is given later regarding erasing an image.

The compound-eye digital camera 1 carries out image taking, recording, and reproducing of an image in the manner described above. Although the above description described the case of taking a still image, the same applies to the case of a moving image. Taking of moving images and still images is controlled by respective release buttons. A configuration may also be adopted in which switching between a moving image and a still image is performed using a menu or a mode select SW for moving images and still images.

<Regarding Image Taking and Recording of Three-Dimensional Images>

A method that sets the protect flag and takes and records image data of a three-dimensional image is described hereunder.

First Embodiment

Figure 2:
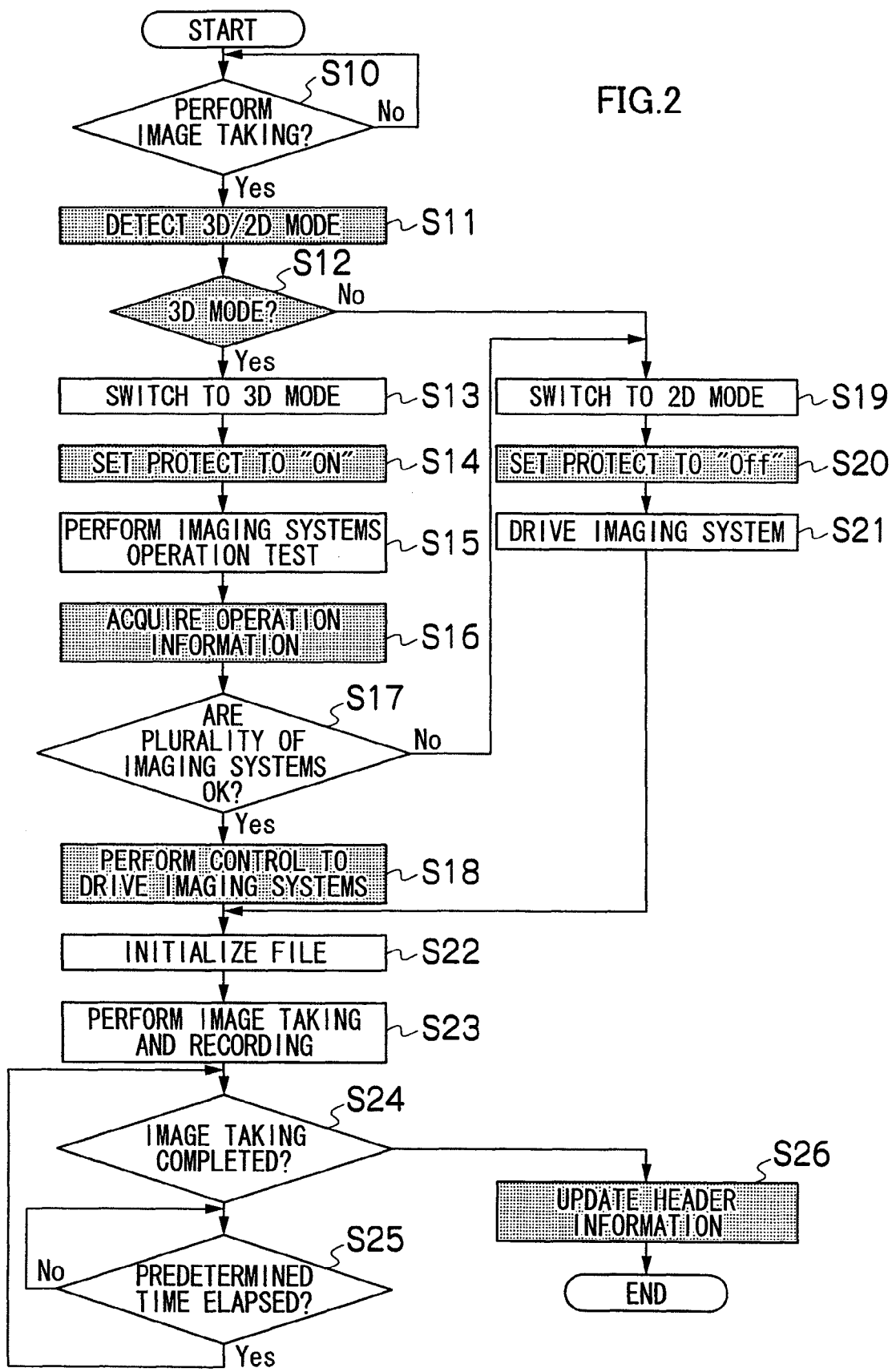
FIG. 2 is a flowchart that illustrates processing of a first embodiment that sets a protect flag and captures and records image data of a three-dimensional image.

FIG. 2 is a flowchart that illustrates the flow of a series of operations to take and record an image in 3D mode. The main CPU 10 performs control in accordance with this flowchart.

The main CPU 10 determines whether or not an image taking instruction is input (step S10). If an image taking instruction has been not input (No at step S10), the main CPU 10 returns to step S10 again. If an image taking instruction has been input (Yes at step S10), detection is performed regarding whether the 2D/3D setting switch 8 is set to 3D mode or set to 2D mode (step S11).

The main CPU 10 determines whether or not the 2D/3D setting switch 8 is set to the 3D mode (step S12). When the 2D/3D setting switch 8 is set to the 3D mode (Yes at step S12), the main CPU 10 switches the operation mode to the 3D mode (step S13). When the 2D/3D setting switch 8 is set to the 2D mode (No at step S12), the main CPU 10 switches the image taking mode to the 2D mode (step S19).

First, the case of the 2D mode is described (steps S19 to S21).

For the 2D mode, the protect flag setting circuit 52 is set to "off" (step S20), one predetermined imaging system is driven, and acquisition of a two-dimensional image is performed (step S21). According to the present embodiment, only the first imaging system 2a is driven.

Next, the case of the 3D mode is described (steps S14 to S18).

For the 3D mode, the protect flag setting circuit 52 is set to "on" (step S14), and an operation test is performed for a plurality of imaging systems (first imaging system 2a and second imaging system 2b) (step S15).

In the operation test, the operating status of the plurality of imaging systems is acquired (step S16), and the main CPU 10 determines whether or not the plurality of imaging systems operate (step S17). When the plurality of imaging systems do not operate normally (No at step S17), the main CPU 10 switches to the 2D mode (step S19). When the plurality of imaging systems operate normally (Yes at step S17), driving of the plurality of imaging systems is controlled to acquire a three-dimensional image (step S18).

Next, file initialization is performed (step S22), image data of the two-dimensional image or three-dimensional image that is acquired is taken in and recorded in the memory card 38 (step S23).

The main CPU 10 then determines whether or not image taking is completed (step S24). When the main CPU 10 determines that image taking is not completed (No at step S24), the main CPU 10 determines whether or not a predetermined time has elapsed after image taking and recording is performed at step S23 (step S25). When the predetermined time has not elapsed (No at step S25), step S25 is performed again. When the predetermined time has elapsed (Yes at step S25), the main CPU 10 returns to the step that performs image taking and recording (step S23).

If the main CPU 10 determines that image taking is completed (Yes at step S24), the header information of the image data recorded at step S23 is updated (step S26). More specifically, when image taking is performed in 3D mode, the image data of the three-dimensional image that is acquired is recorded in the memory card 38 in a state in which the protect flag that is set to "on" at step S14 is written in the header.

Although the above description described a case of taking a still image, the same situation applies to a case of taking moving images. Since moving images are consecutively taken, a protect flag can also be written at the same time when writing information such as the image taking time of a moving image.

By automatically setting a protect flag and performing image taking and recording of a three-dimensional image in this manner, it is possible to protect the three-dimensional image so that it is not erased and also to prevent deletion of information required for reproducing of the three-dimensional image even in a case in which a three-dimensional image that is taken using a device that supports three-dimensional images is edited or the like with a device that only supports two-dimensional images.

Further, since the three-dimensional image is protected, a configuration can be adopted in which the three-dimensional image is not erased even by carelessness or erroneous operation of the user.

Although according to the present embodiment the protect flag is set to "on" in the case of a three-dimensional image, a configuration may be adopted in which the image is recorded with the access flag of the image file set to "write inhibit".

Second Embodiment

To form a three-dimensional image, at least two two-dimensional images that are taken from different angles in the horizontal direction are required. When taking an image by vertical shooting using the compound-eye digital camera 1, since two-dimensional images cannot be obtained from different angles in the horizontal direction, it is not possible to form a three-dimensional image.

Figure 3:
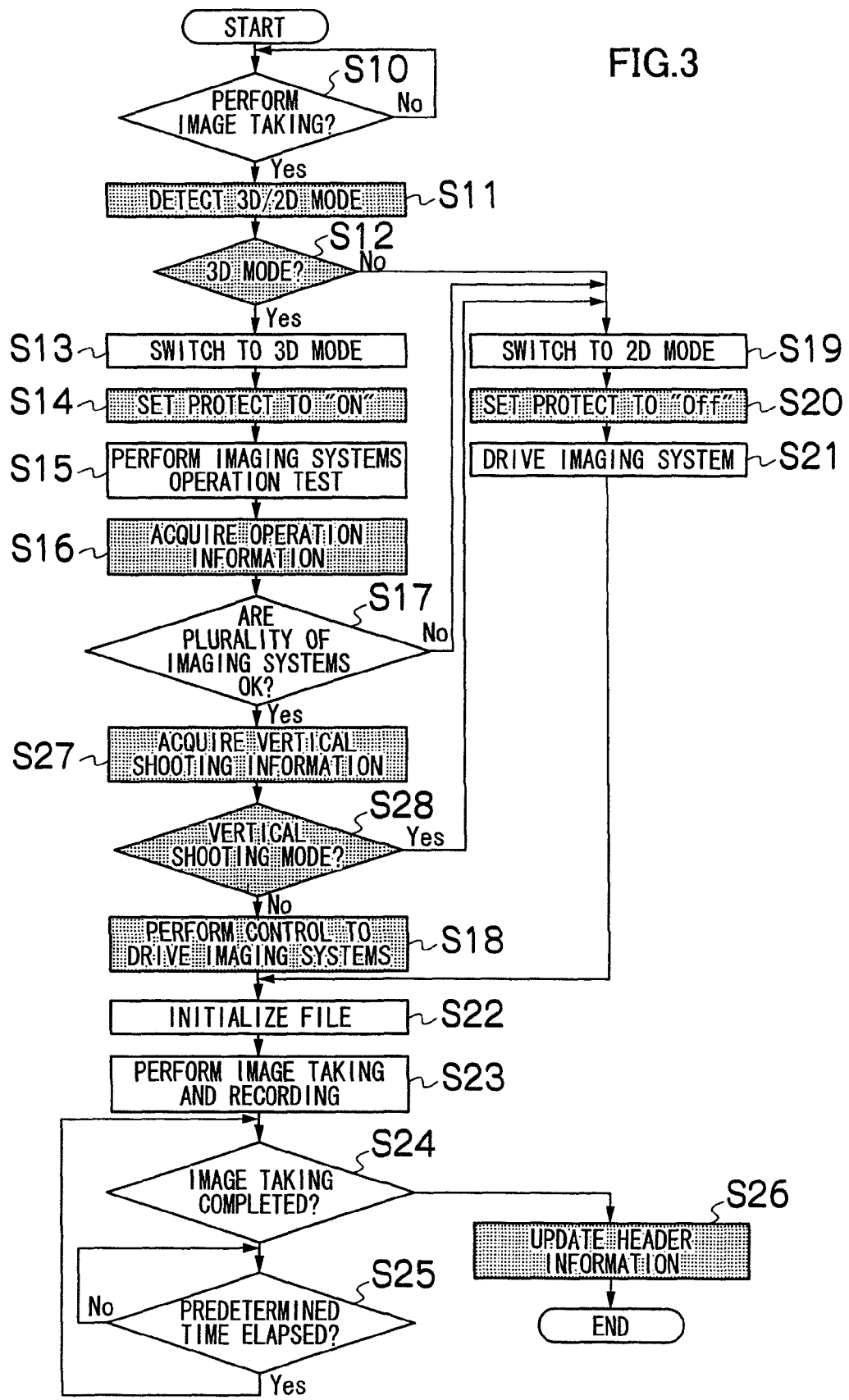
FIG. 3 is a flowchart that illustrates processing of a second embodiment that sets a protect flag and captures and records image data of a three-dimensional image.

According to the second embodiment that sets the protect flag and takes and records image data of a three-dimensional image, the main CPU 10 determines whether vertical shooting of horizontal shooting is to be performed in the 3D mode, and when vertical shooting is to be performed, the main CPU 10 switches from the 3D mode to the 2D mode. FIG. 3 is a flowchart that illustrates the flow of a series of operations of the second embodiment that takes and records an image in 3D mode. The main CPU 10 performs control in accordance with this flowchart. In this connection, sections that are the same as in the first embodiment are assigned the same reference numerals, and a detailed description of those sections is omitted.

The main CPU 10 determines whether or not an image taking instruction is input (step S10). If an image taking instruction has been not input (No at step S10), the main CPU 10 returns to step S10 again. If an image taking instruction has been input (Yes at step S10), it is determined whether the 2D/3D setting switch 8 is set to the 3D mode or set to the 2D mode (step S11).

The main CPU 10 determines whether or not the 2D/3D setting switch 8 is set to the 3D mode (step S12). When the 2D/3D setting switch 8 is set to the 3D mode (Yes at step S12), the main CPU 10 switches the operation mode to the 3D mode (step S13). When the 2D/3D setting switch 8 is set to the 2D mode (No at step S12), the main CPU 10 switches the image taking mode to the 2D mode (step S19).

In the case of the 2D mode (step S19), the protect flag setting circuit 52 is set to "off" (step S20), one predetermined imaging system is driven, and acquisition of a two-dimensional image is performed (step S21).

In the case of the 3D mode (step S13), the protect flag setting circuit 52 is set to "on" (step S14), and an operation test is performed for a plurality of imaging systems (first imaging system 2*a* and second imaging system 2*b*) (step S15).

In the operation test, the operating status of the plurality of imaging systems is acquired (step S16), and the main CPU 10 determines whether or not the plurality of imaging systems operate (step S17). When the plurality of imaging systems do not operate normally (No at step S17), the main CPU 10 switches to the 2D mode (step S19).

When the plurality of imaging systems operate normally (Yes at step S17), information indicating whether or not vertical shooting is to be performed is acquired from the vertical shooting detection circuit 50 (step S27), and the main CPU 10 determines whether or not the compound-eye digital camera 1 is in the vertical shooting mode that acquires images by vertical shooting (step S28).

When the compound-eye digital camera 1 is in the vertical shooting mode (Yes at step S28), the main CPU 10 switches to the 2D mode since a three-dimensional image cannot be acquired (step S19).

When the compound-eye digital camera 1 is not in the vertical shooting mode (No at step S28), since a three-dimensional image can be acquired, the plurality of imaging systems are drivingly controlled to acquire a three-dimensional image (step S18).

Next, file initialization is performed (step S22), image data of the two-dimensional image or three-dimensional image that is acquired is taken in, and that image data is recorded in the memory card 38 (step S23).

The main CPU 10 then determines whether or not image taking is completed (step S24). When the main CPU 10 determines that image taking is not completed (No at step S24), the main CPU 10 determines whether or not a predetermined time has elapsed after image taking and recording is performed at step S23 (step S25). When the predetermined time has not elapsed (No at step S25), step S25 is performed again. When the predetermined time has elapsed (Yes at step S25), the main CPU 10 returns to the step that performs image taking and recording (step S23).

If the main CPU 10 determines that image taking is completed (Yes at step S24), the header information of the image data recorded at step S23 is updated (step S26). More specifically, when image taking is performed in 3D mode, the protect flag that is set to "on" at step S14 is written in the header.

In this connection, although in the above description image taking is performed using one imaging system in the case of vertical shooting, image taking may also be performed with a configuration in which the number of imaging systems is reduced from the maximum number.

By automatically setting a protect flag and performing image taking and recording of a three-dimensional image in this manner, it is possible to protect a three-dimensional image so that it is not erased even in a case in which a three-dimensional image that is taken using a device that supports three-dimensional images is edited or the like with a device that only supports two-dimensional images.

Further, since the three-dimensional image is protected, a configuration can be adopted in which the three-dimensional image is not erased even by carelessness or erroneous operation of the user.

Furthermore, in a case in which a three-dimensional image cannot be acquired because vertical shooting is performed or the like even when in the 3D mode, the 2D mode can be switched to automatically and the protect flag can be set to "off". It is thereby possible to prevent a case in which image data is needlessly protected.

<Case in which Memory Card with Three-Dimensional Image Recorded Thereon is Connected>

A case is now described in which the memory card 38 on which a two-dimensional image or a three-dimensional image is recorded is connected to the compound-eye digital camera 1.

Although protection is automatically applied to a three-dimensional image taken by the above described compound-eye digital camera 1 at the same time as the image is recorded, it is desirable to also protect a three-dimensional image that is taken by a compound-eye digital camera that does not automatically protect three-dimensional images.

Hereunder, a method that automatically applies protection to an unprotected three-dimensional image is described.

First Embodiment

Figure 4:
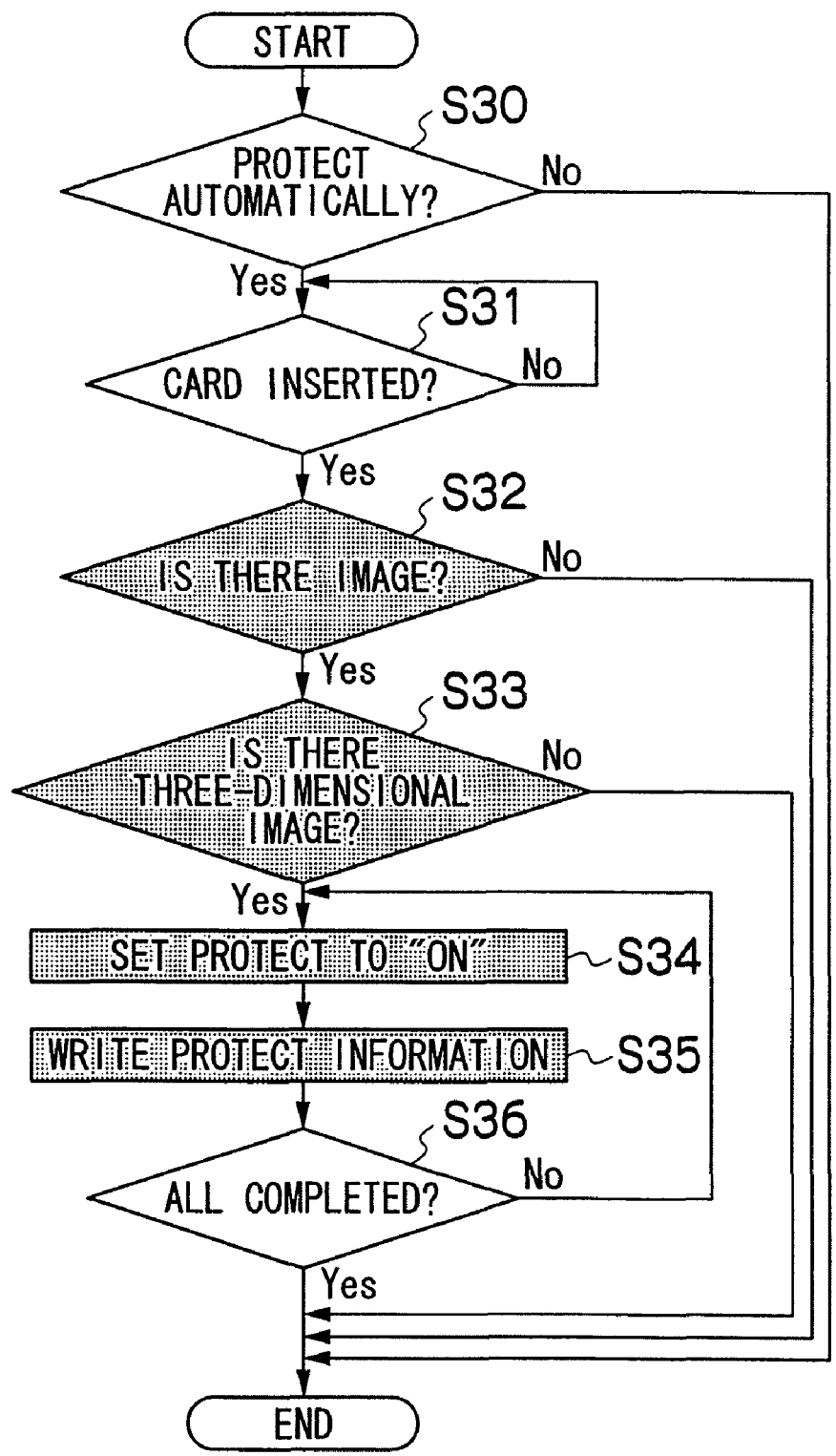
FIG. 4 is a flowchart that illustrates processing in a case in which a memory card on which a three-dimensional image is recorded is inserted.

FIG. 4 is a flowchart that illustrates the flow of processing in a case in which the memory card 38 is connected to the compound-eye digital camera 1 by a method such as inserting the memory card 38 into a card slot of the compound-eye digital camera 1. The main CPU 10 performs control according to this flowchart.

First, the main CPU 10 determines whether or not an instruction is made to apply protection to a three-dimensional image, by a menu selection or the like (step S30). When protection is not to be applied to a three-dimensional image (No at step S30), the processing ends. When protection is to be applied to a three-dimensional image (Yes at step S30), the main CPU 10 determines whether or not the memory card 38 is inserted in a card slot (step S31). In this connection, a configuration can be adopted in which the processing of step S30 is omitted and protection is applied in all cases in which a card is inserted. However, by enabling a selection as to whether or not to apply protection to a three-dimensional image, the degree of freedom for the user's selection can be increased.

When the memory card 38 is not inserted in the card slot (No at step S31), the processing of step S31 is performed again.

When the memory card 38 is inserted in the card slot (Yes at step S31), the main CPU 10 determines whether or not there are images on the memory card 38 (step S32).

When there are no images on the memory card 38 (No at step S32), the processing ends.

When there are images on the memory card 38 (Yes at step S32), the main CPU 10 determines whether or not a three-dimensional image is included in the images (step S33).

When there is no three-dimensional image included (No at step S33), the processing ends.

When there is a three-dimensional image included (Yes at step S33), the main CPU sets a protect flag for that three-dimensional image to "on" (step S34), and writes the protect flag in the header (step S35).

The main CPU 10 then determines whether or not processing (steps S34 and S35) that sets a protect flag to "on" and writes the protect flag in the header has been performed for all the three-dimensional images included in the memory card 38 (step S36).

When the processing of steps S34 and S35 is not completed for all the three-dimensional images (No at step S36), the processing of steps S34 and S35 is performed again.

When the processing of steps S34 and S35 is completed for all the three-dimensional images (Yes at step S36), the processing is ended.

When the above described processing (step S30 to S36) is completed, all of the processing may be ended, or the aforementioned protect flag setting circuit 52 may be set to perform processing to take and record image data of a three-dimensional image.

Thus, by protecting a three-dimensional image when a card including the three-dimensional image is inserted, protection can be automatically applied to a multi-viewpoint image that is taken by a device that does not automatically apply protection to a 3D/multi-viewpoint image.

Although according to the present embodiment a configuration is adopted in which insertion of a memory card is detected, and detection is then performed with respect to the inserted memory card to ascertain whether or not it contains image data or files, a configuration may also be adopted in which initially all files and data for three-dimensional images are searched, and rewriting of flags is performed based on the search results.

Although according to the present embodiment protection is applied (step S34) to all three-dimensional images, a configuration may also be adopted in which the tag information attached to the three-dimensional images is examined and protection is applied only to unprotected three-dimensional images, and not to three-dimensional images that are already protected.

Further, although according to the present embodiment insertion of a memory card is detected and protection is applied to three-dimensional images recorded on the memory card, the present embodiment is not limited to a memory card and is also applicable to three-dimensional images recorded on a PC connected to a compound-eye digital camera or a server connected to via a LAN or the like. In this case, the compound-eye digital camera may detect the connection to the PC or server on a network and thereafter perform the processing of steps S32 to S36.

Second Embodiment

The first embodiment that automatically applies protection to unprotected three-dimensional images sets a protect flag for three-dimensional images that are retrieved on the memory card 38. However, a method of applying protection to three-dimensional images is not limited to setting a protect flag for each piece of image data.

Figure 5:
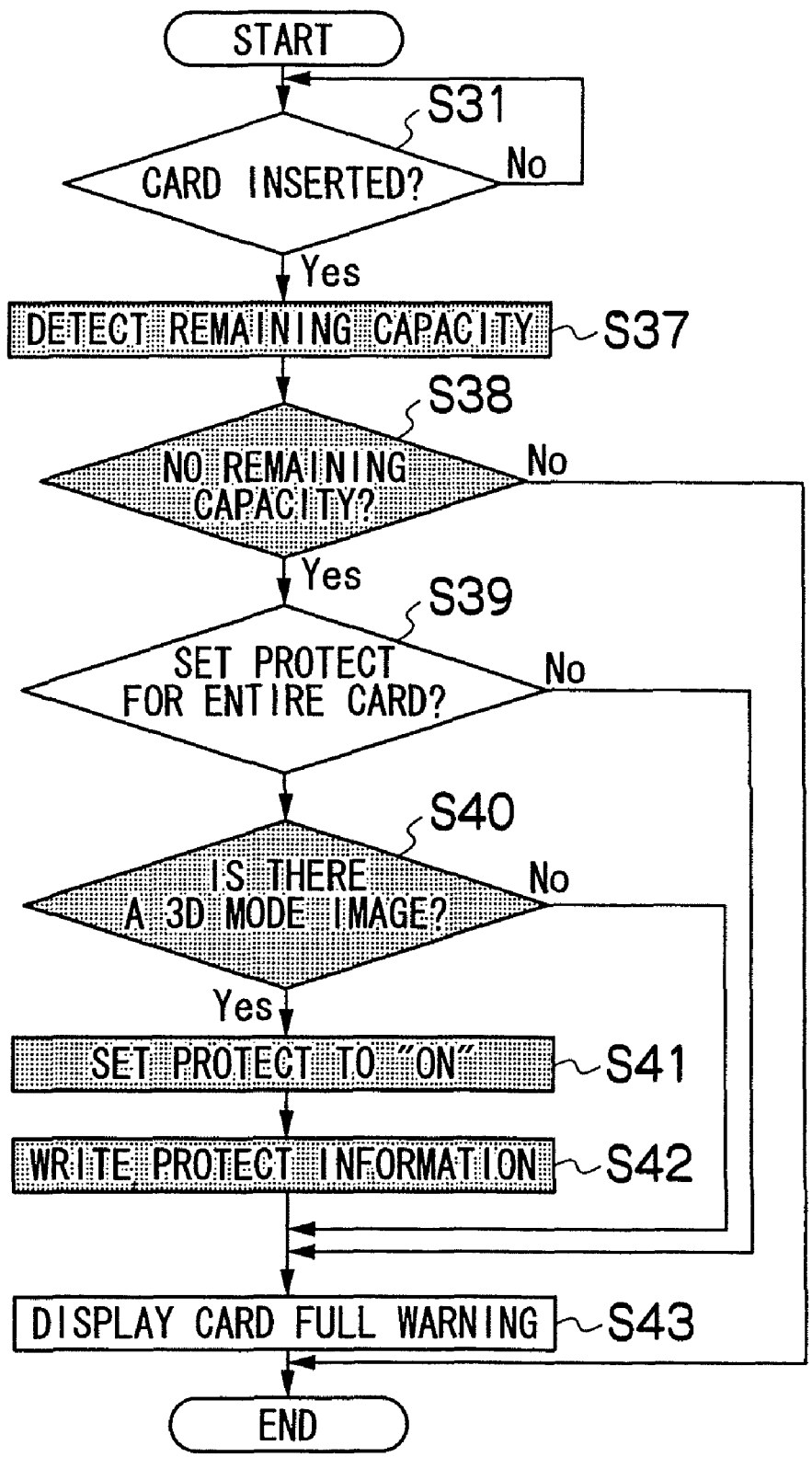
FIG. 5 is a flowchart that illustrates processing in a case in which a memory card on which a three-dimensional image is recorded is inserted.

The second embodiment that automatically applies protection to three-dimensional images applies protection to the memory card itself on which three-dimensional images are recorded. FIG. 5 is a flowchart that illustrates the flow of a series of processing according to the second embodiment that automatically applies protection to three-dimensional images. The main CPU 10 performs control according to this flowchart. In this connection, sections that are the same as in the first embodiment are assigned the same reference numerals, and a detailed description of those sections is omitted.

First, the main CPU 10 determines whether or not the memory card 38 is inserted in a card slot (step S31). When the memory card 38 is not inserted in the card slot (No at step S31), the processing of step S31 is performed again.

When the memory card 38 is inserted in the card slot (Yes at step S31), the main CPU 10 detects the residual capacity of the memory card 38 (step S37), and determines whether or not the memory card 38 has a residual capacity capable of recording newly taken images (step S38).

When the memory card 38 has a residual capacity that is sufficient to record newly taken images (No at step S38), the processing ends.

When the memory card 38 does not have a residual capacity capable of recording newly taken images (Yes at step S38), the main CPU 10 determines whether or not to make a setting to apply protection to the entire memory card 38 (step S39).

When protection is not to be applied to the entire memory card 38 (No at step S39), a warning display to the effect that the capacity of the memory card 38 has run out is displayed (step S43), and thereafter the processing is ended.

When protection is to be applied to the entire memory card 38 (Yes at step S39), the main CPU 10 determines whether or not there is a three-dimensional image in the memory card 38 (step S40).

When there is no three-dimensional image in the memory card 38 (No at step S40), a warning display to the effect that the capacity of the memory card 38 has run out is displayed (step S43), and thereafter the processing is ended.

When there is a three-dimensional image in the memory card 38 (Yes at step S40), a protect flag for the entire memory card is set to "on" (step S41), and the protect flag is written in tag information or the like attached to the memory card 38 (step S42).

Thereafter, a warning display to the effect that the capacity of the memory card 38 has run out is displayed (step S43), and the processing is ended.

When the above described processing (step S31 and steps S37 to S43) is completed, all of the processing may be ended, or the aforementioned protect flag setting circuit 52 may be set to perform processing to take and record image data of a three-dimensional image.

Thus, by applying protection to an entire recording medium on which a three-dimensional image is recorded, protection can be automatically applied to a multi-viewpoint image that is taken by a device that does not automatically apply protection to a 3D/multi-viewpoint image.

Further, since double protection consisting of protection of the image and protection of the recording medium is applied in a case in which a protect flag is set for a three-dimensional image included in a recording medium, protection of image data can be made more secure.

In this connection, as a warning method, other than a text display method that displays a message on a screen, a method utilizing sound or an alarm or the like may be used.

Further, although according to the present embodiment insertion of a memory card is detected and protection is applied to the entire memory card, the present embodiment is not limited to a memory card and is also applicable to an image folder on a PC connected to a compound-eye digital camera or a server that is connected to via a LAN or the like. In this case, the compound-eye digital camera may detect the connection to the PC or the server on a network, detect whether or not there is an image folder on the PC or server, and thereafter perform the processing of steps S40 to S42.

<Erasing and Editing Three-Dimensional Images>

Erasure and editing of a three-dimensional image that is recorded on the memory card 38 and for with a protect flag is set will now be described.

Since a protect flag is set for a three-dimensional image to protect the three-dimensional image, the image cannot be erased or edited in that state. However, when erasure or editing of the image is necessary in a case where the user recognizes the fact that the image is protected, it is necessary to place the image in a state that enables erasure or editing processing.

Hereunder, a method of erasing and editing a three-dimensional image for which a protect flag is set is described.

(Erasing Three-Dimensional Images)

Figure 6:
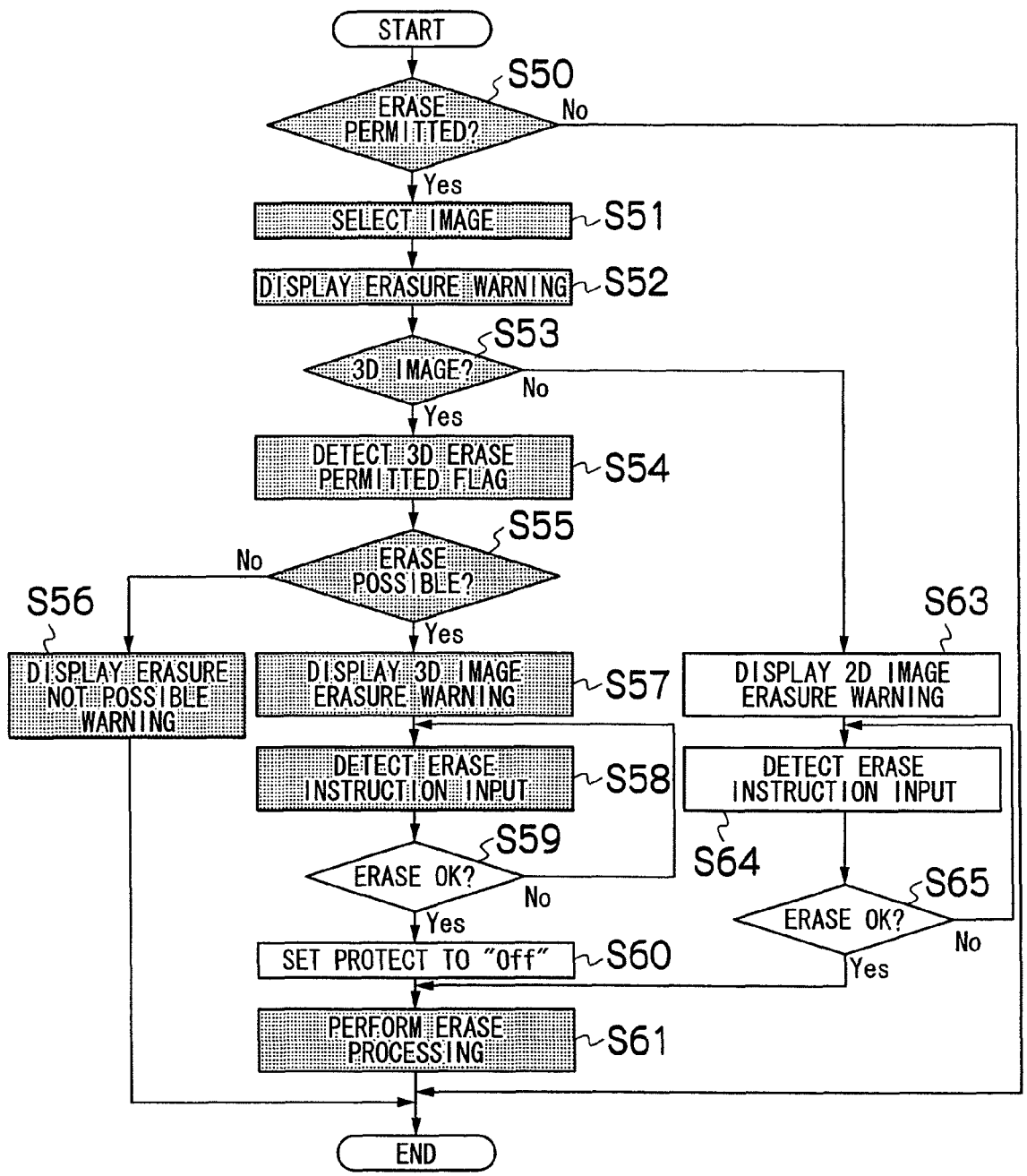
FIG. 6 is a flowchart that illustrates the flow of processing that erases a three-dimensional image.

FIG. 6 is a flowchart illustrating the flow of processing to erase a three-dimensional image. To perform this processing, it is necessary to previously set an erase permitted mode that enables erasure of three-dimensional image for which a protect flag is set, using the protection cancellation switch 7. The main CPU 10 performs control in accordance with this flowchart.

First, the main CPU 10 determines whether or not the operation mode of the compound-eye digital camera 1 is set to an erase mode that is an operation mode that erases a two-dimensional image or a three-dimensional image (step S50).

When the operation mode is not set to the erase mode (No at step S50), the processing ends.

When the operation mode is set to the erase mode (Yes at step S50), the image the user wants to erase is selected (step S51). A message warning the user that the selected image is to be erased is then displayed (step S52). Selection of an image is performed by depressing the information position specification key in a state in which the image the user wants to erase is displayed on the image display LCD 6. Warning of image erasure is performed by the main CPU 10 displaying on the image display LCD 6 a message that conveys the fact that the image will be erased such as "Okay to erase this image?" over the image via the controller 34. Besides the above kind of text display, a warning may also be given using sound or the like.

Next, the main CPU 10 determines whether or not the selected image is a three-dimensional image (step S53). When the selected image is not a three-dimensional image (No at step S53), the main CPU 10 proceeds to steps to erase a two-dimensional image (steps S63 to S65).

When the selected image is a three-dimensional image (Yes at step S53), the main CPU 10 detects whether or not an erase permitted flag is set for that three-dimensional image (step S54). An erase permitted flag is a flag that is set only in a case in which an erase permitted mode is set that enables erasure of a three-dimensional image for which a protect flag is set. The erase permitted flag is set for each three-dimensional image for which a protect flag is set.

The main CPU 10 determines whether or not an erase permitted flag is set for the selected three-dimensional image, that is, whether or not an erase permitted flag is detected at step S54 (step S55).

When the erase permitted flag is not set (No at step S55), since the erase permitted mode is not set, i.e. since that three-dimensional image cannot be erased, a message is displayed that alerts the user to the fact that erasure of the image is not possible (step S56), and the processing is ended.

When the erase permitted flag is set (Yes at step S55), a message to warn the user that the three-dimensional image will be erased is displayed (step S57), and the main CPU 10 then detects whether or not the user inputs an erase instruction (step S58). Input of the erase instruction is performed by depressing the information position specification key.

The main CPU 10 determines whether or not erasure of the image is possible based on input of the erase instruction (step S59). When erasure is not possible (No at step S59), the main CPU 10 detects whether or not an erase instruction is input by the user once more (step S58).

When erasure of the image is possible (Yes at step S59), the main CPU 10 cancels the protect flag setting of the three-dimensional image (step S60), and performs erase processing (step S61). Cancellation of the protect flag is performed by a system call. The erase processing is performed by erasing an image file recorded on the memory card 38 via the I/F 39.

In the steps that erase a two-dimensional image (steps S63 to S65), a message that warns the user the two-dimensional image will be erased is displayed (step S63), and the main CPU 10 detects whether or not the user inputs an erase instruction (step S64). Input of the erase instruction is performed by depressing the information position specification key.

The main CPU 10 determines whether or not erasure of the image is possible based on input of the erase instruction (step S65). When erasure is not possible (No at step S65), the main CPU 10 detects whether or not an erase instruction is input by the user once more (step S64).

When erasure of the image is possible (Yes at step S65), the main CPU 10 performs erase processing (step S61). The erase processing is performed by erasing an image file recorded on the memory card 38 via the I/F 39.

A configuration may be adopted whereby, when the above described processing (step S50 to S65) is completed, all of the processing is ended, the erase processing is performed once more, or the compound-eye digital camera 1 is automatically switched to the image taking mode.

Thus, since a warning is given before erasing a three-dimensional image, it is possible to prevent a user erroneously erasing a three-dimensional image.

Further, since erasure of a three-dimensional image can be performed with a device that supports three-dimensional images as long as the setting permits erasure of the image, it is possible to erase a three-dimensional image which the device knows may be erased and there is no necessity to keep unwanted files.

The present embodiment is applicable to not only three-dimensional images recorded on an internal memory or a storage medium or the like, but also to three-dimensional images stored on a PC or a server on a network. Further, by using a program that causes the above described processing to be performed, the present embodiment can be applied not only to a compound-eye digital camera but also to a variety of devices such as a PC and a terminal for image printing.

(Editing Three-Dimensional Images)

Figure 7:
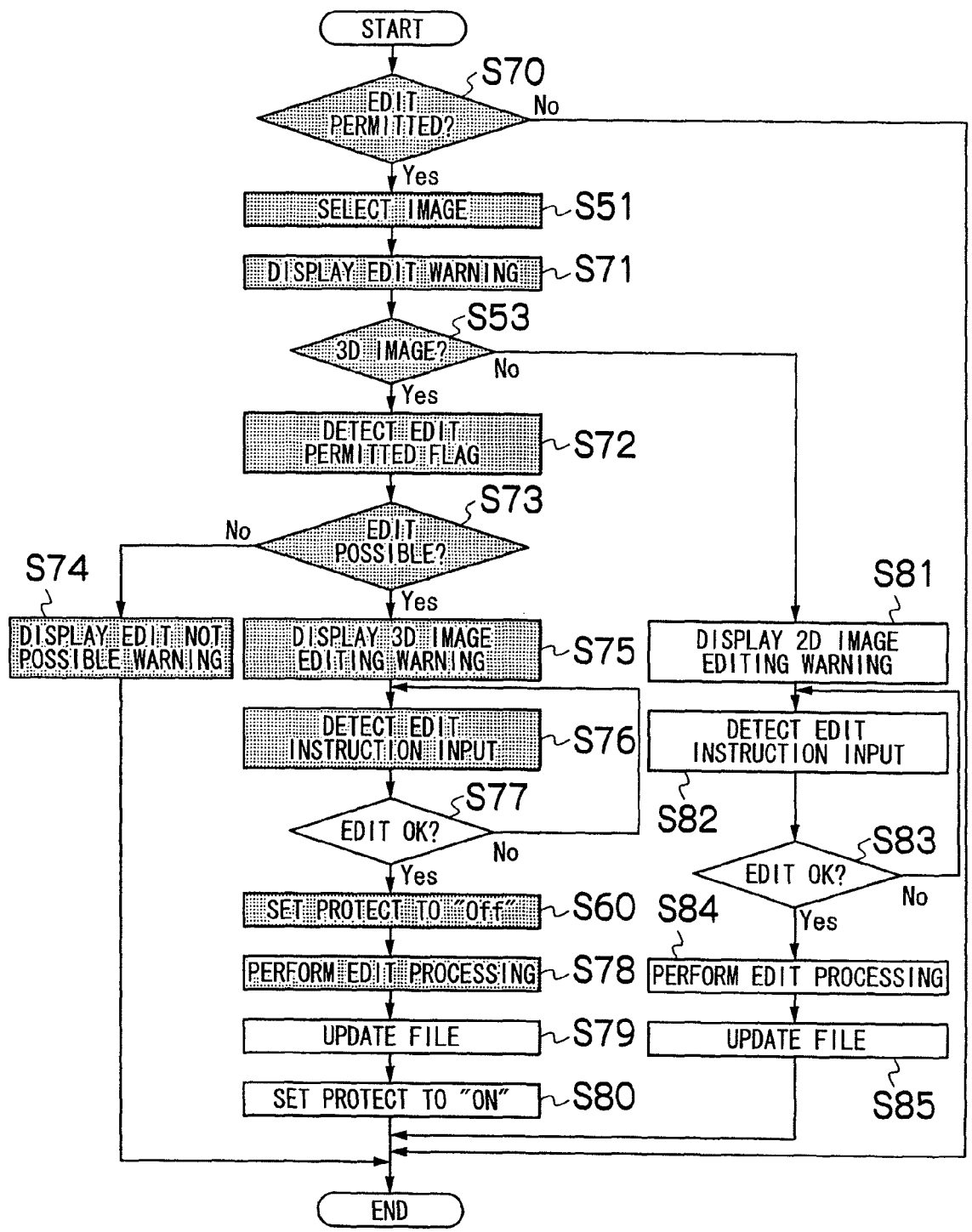
FIG. 7 is a flowchart that illustrates the flow of processing that edits a three-dimensional image.

FIG. 7 is a flowchart illustrating the flow of processing to edit a three-dimensional image. This processing is performed in an edit permitted mode that is an operation mode that enables editing of a three-dimensional image for which a protect flag is set. The main CPU 10 performs control in accordance with this flowchart. It is possible to start this processing in a state in which the edit permitted mode is already set using a setting screen of the compound-eye digital camera 1 or the like. In the following description, the same reference numerals are used to denote processing of steps that are the same as steps of the erase processing for a three-dimensional image, and a description of those processing steps is omitted.

First, the main CPU 10 determines whether or not the operation mode of the compound-eye digital camera 1 is set to an edit mode that is an operation mode that edits a two-dimensional image or a three-dimensional image (step S70).

When the operation mode is not set to the edit mode (No at step S70), the processing is ended.

When the operation mode is set to the edit mode (Yes at step S70), the image the user wants to edit is selected (step S51). A message warning the user that that image is to be edited is then displayed (step S71). Selection of an image is performed by depressing an information position specification key in a state in which the image the user wants to edit is displayed on the image display LCD 6. The main CPU 10 warns the user that the image will be edited by displaying on the image display LCD 6 a message that conveys the fact that the image will be edited such as "Okay to edit this picture?" over the image via the controller 34. Besides a text display, a warning may also be given using sound or the like.

Next, the main CPU 10 determines whether or not the selected image is a three-dimensional image (step S53). When the selected image is not a three-dimensional image (No at step S53), the main CPU 10 proceeds to steps to edit a two-dimensional image (steps S78 to S80).

When the selected image is a three-dimensional image (Yes at step S53), it is detected whether or not an edit permitted flag is set for that three-dimensional image (step S72). An edit permitted flag is a flag that is set only in a case in which an edit permitted mode is set that enables editing of a three-dimensional image for which a protect flag is set. The edit permitted flag is set for each three-dimensional image for which a protect flag is set.

The main CPU 10 determines whether or not an edit permitted flag is set for the selected three-dimensional image, that is, whether or not an edit permitted flag is detected at step S72 (step S73).

When the edit permitted flag is not set (No at step S73), since the edit permitted mode is not set, i.e. since that three-dimensional image cannot be edited, a message is displayed that alerts the user to the fact that editing of the image is not possible (step S74), and the processing is ended.

When the edit permitted flag is set (Yes at step S73), a message to warn the user that the three-dimensional image will be edited is displayed (step S75), and the main CPU 10 then detects whether or not the user inputs an edit instruction (step S76). Input of the edit instruction is performed by depressing the information position specification key.

The main CPU 10 determines whether or not editing of the image is possible based on input of the edit instruction (step S77). When editing is not possible (No at step S77), the main CPU 10 again detects whether or not an edit instruction is input by the user once more (step S76).

When editing of the image is possible (Yes at step S77), the main CPU 10 cancels the protect flag setting of the three-dimensional image (step S60), and performs edit processing of the three-dimensional image (step S78). Edit processing is performed by previously registering a plurality of types of editing contents, selecting the desired editing contents from among the plurality of types of editing contents using the information position specification key, and pressing menu/OK to execute the selected editing contents.

When the edit processing is completed, the file of the three-dimensional image is updated from the pre-editing file to the post-editing file (step S79), and a protect flag is written with respect to the updated file (step S80). As a result, the file of the edited three-dimensional image is protected.

In the steps that edit a two-dimensional image (steps S81 to S85), a message that warns the user the two-dimensional image will be edited is displayed (step S81), and the main CPU 10 detects whether or not the user inputs an edit instruction (step S82). Input of the edit instruction is performed by depressing the information position specification key.

The main CPU 10 determines whether or not editing of the image is possible based on input of the edit instruction (step S83). When editing is not possible (No at step S83), the main CPU 10 detects whether or not an edit instruction is input by the user once more (step S82).

When editing of the image is possible (Yes at step S83), the main CPU 10 performs edit processing of the two-dimensional image (step S84) and updates the two-dimensional image file from the pre-editing file to a post-editing file (step S85). The edit processing (step S84) is the same as the edit processing for a three-dimensional image (step S78).

A configuration may be adopted whereby, when the above described processing (steps S51, S53, and S70 to S85) is completed, all of the processing is ended, the edit processing is performed once more, or the compound-eye digital camera 1 is automatically switched to the image taking mode.

Thus, since a protect flag is automatically set for a three-dimensional image, a three-dimensional image will not inadvertently be lost even when using a device that supports only two-dimensional images to perform editing or the like of a three-dimensional image that is taken with a device that supports three-dimensional images.

Further, since a warning is given before executing editing of a three-dimensional image, it is possible to prevent a user erroneously editing a three-dimensional image. For example, by previously applying a read inhibit setting to a three-dimensional image using a protect flag, a user can carefully copy a three-dimensional image using a different file name and perform editing for the copied three-dimensional image. It is thereby possible to effectively protect a captured three-dimensional image.

Furthermore, by setting a protect flag for an edited three-dimensional image it is possible to protect not only the captured three-dimensional image, but also the three-dimensional image file after editing.

Also, if a device that supports three-dimensional images is set to permit editing of images, since editing of three-dimensional images is possible, editing of images on the device is also possible.

When editing of an image is selected, it is possible to copy an image to a file with a name that is close to the file name of the selected image and edit the copied image.

A configuration may also be adopted that issues a warning again before recording. It is thereby possible to prevent recording of a three-dimensional image that is erroneously edited.

The present embodiment is applicable to not only three-dimensional images recorded on an internal memory or a storage medium or the like, but also to three-dimensional images stored on a PC or a server on a network. Further, by using a program that causes the above described processing to be performed, the present embodiment can be applied not only to a compound-eye digital camera but also to a variety of devices such as a PC and a terminal for image printing.

According to the present invention, since compatibility with conventional standards can be ensured by simply making the present invention correspond with devices that conform to 3D/multi-viewpoint standards, the occurrence of problems due to the existence of 3D/multi-viewpoint images can be prevented.

In this connection, there is no necessity that a three-dimensional image by acquired with the compound-eye digital camera 1 as described above, and the three-dimensional image may be acquired by continuous image taking by a motion stereo method using a single-eye camera.

What is claimed is:

1. An image taking apparatus, comprising:
    an image taking mode switching device which switches between a multi-viewpoint image taking mode that takes a subject image that is viewed from a plurality of viewpoints and a single viewpoint image taking mode that takes a subject image that is viewed from a single viewpoint;
    an image taking mode detection device which detects the image taking mode that is switched to by the image taking mode switching device;
    an image pickup device which acquires a multi-viewpoint image or a single viewpoint image that is taken in the image taking mode that is switched to by the image taking mode switching device;
    a recording device which records a multi-viewpoint image or a single viewpoint image acquired with the image pickup device on a recording medium;
    a protection setting device which, in a case where the multi-viewpoint image taking mode is detected by the image taking mode detection device, sets a protection with respect to a multi-viewpoint image that is recorded by the recording device so that the multi-viewpoint image is not changed;
    an edit mode setting device which, in a case where images including the multi-viewpoint image are recorded on the recording medium, sets an edit mode that edits a desired image that is selected from among the images;
    an edit mode detection device which detects whether or not the edit mode is set;
    a protection canceling device which, when selection of the multi-viewpoint image is confirmed in a case where the edit mode is detected by the edit mode detection device, cancels the protection that is set for the selected multi-viewpoint image; and
    an editing device which edits the multi-viewpoint image for which the protection is cancelled by the protection canceling device,
    wherein the recording device records the multi-viewpoint image that is edited by the editing device on a recording medium, and the protection setting device sets a protection with respect to the edited multi-viewpoint image that is recorded by the recording device so that the multi-viewpoint image is not changed.

2. The image taking apparatus according to claim 1, wherein
    the image pickup device comprises:
    a plurality of imaging systems having a plurality of optical systems and image pickup elements that form a subject image;
    a driving device which drives the plurality of imaging systems in a case in which the multi-viewpoint image taking mode is switched to by the image taking mode switching device, and which drives a single imaging system in a case in which the single viewpoint image taking mode is switched to by the image taking mode switching device; and
    a drive detection device that detects whether or not driving of the imaging system by the driving device is completed, and
    wherein, in a case in which the multi-viewpoint image taking mode is detected by the image taking mode detection device and the drive detection device detects that the plurality of imaging systems are not driving, the image taking mode switching device switches from the multi-viewpoint image taking mode to the single viewpoint image taking mode.

3. The image taking apparatus according to claim 1, further comprising a vertical shooting detection device that detects whether or not the image taking apparatus is in a state that vertically shoots a subject image,
    wherein, in a case in which the multi-viewpoint image taking mode is switched to by the image taking mode switching device and the vertical shooting detection device detects that the image taking apparatus is in a state that vertically shoots a subject image, the image taking mode switching device switches from the multi-viewpoint image taking mode to the single viewpoint image taking mode.

4. The image taking apparatus according to claim 3, wherein the recording device records the multi-viewpoint image that is edited with the editing device on the recording device after issuing a warning.

5. An image taking apparatus, comprising:
an image taking mode switching device which switches between a multi-viewpoint image taking mode that takes a subject image that is viewed from a plurality of viewpoints and a single viewpoint image taking mode that takes a subject image that is viewed from a single viewpoint;
an image taking mode detection device which detects the image taking mode that is switched to by the image taking mode switching device;
an image pickup device which acquires a multi-viewpoint image or a single viewpoint image that is taken in the image taking mode that is switched to by the image taking mode switching device;
a recording device which records a multi-viewpoint image or a single viewpoint image acquired with the image pickup device on a recording medium;
a protection setting device which, in a case where the multi-viewpoint image taking mode is detected by the image taking mode detection device, sets a protection with respect to a multi-viewpoint image that is recorded by the recording device so that the multi-viewpoint image is not changed;
an erase mode setting device which, in a case where images including the multi-viewpoint image are recorded on the recording medium, sets an erase mode that erases a desired image that is selected from among the images;
an erase mode detection device which detects whether or not the erase mode is set; and
an erasing device which, when selection of the multi-viewpoint image is confirmed in a case where the erase mode is detected by the erase mode detection device, cancels the protection that is set for the selected multi-viewpoint image and erases the multi-viewpoint image.

6. The image taking apparatus according to claim 5, further comprising:
an edit mode setting device which, in a case where images including the multi-viewpoint image are recorded on the recording medium, sets an edit mode that edits a desired image that is selected from among the images;
an edit mode detection device which detects whether or not the edit mode is set;
a protection canceling device which, when selection of the multi-viewpoint image is confirmed in a case where the edit mode is detected by the edit mode detection device, cancels the protection that is set for the selected multi-viewpoint image; and
an editing device which edits the multi-viewpoint image for which the protection is cancelled by the protection canceling device,
wherein the recording device records the multi-viewpoint image that is edited by the editing device on a recording medium, the protection setting device is a protection setting device which sets a protection so that the multi-viewpoint image is not changed or deleted, and the protection setting device sets a protection with respect to the edited multi-viewpoint image that is recorded by the recording device so that the multi-viewpoint image is not changed or deleted.

7. An image reproducing apparatus, comprising:
a connection device to which a recording medium than can record a subject image is connected;
a detection device which detects that the recording medium is connected to the connection device;
a first judgment device which, in a case where connection of the recording medium is detected by the detection device, judges whether or not a multi-viewpoint image that is a subject image that is viewed from a plurality of viewpoints is recorded on the recording medium; and
a first protection setting device which, in a case where the first judgment device judges that the multi-viewpoint image is recorded, sets a protection with respect to the recorded multi-viewpoint image so that the multi-viewpoint image is not changed;
an edit mode setting device which, in a case where images including the multi-viewpoint image are recorded on the recording medium, sets an edit mode that edits a desired image that is selected from among the images;
an edit mode detection device which detects whether or not the edit mode is set;
a protection canceling device which, when selection of the multi-viewpoint image is confirmed in a case where the edit mode is detected by the edit mode detection device, cancels the protection that is set for the selected multi-viewpoint image; and
an editing device which edits the multi-viewpoint image for which the protection is cancelled by the protection canceling device,
wherein the recording device records the multi-viewpoint image that is edited by the editing device on a recording medium, and the protection setting device sets a protection with respect to the edited multi-viewpoint image that is recorded by the recording device so that the multi-viewpoint image is not changed.

8. The image reproducing apparatus according to claim 7, further comprising:
a second judgment device which, when connection of the recording medium is detected by the detection device, judges whether or not a new subject image can be recorded on the recording medium; and
a second protection setting device which, when the second judgment device judges that a new subject image cannot be recorded on the recording medium, sets a protection with respect to the recording medium so that a multi-viewpoint image or a single viewpoint image that is recorded on the recording medium is not changed or deleted.

9. An image taking apparatus, comprising the image reproducing apparatus according to claim 7.

10. An image reproducing apparatus, comprising:
a connection device to which a recording medium that can record a subject image is connected;
a detection device which detects that the recording medium is connected to the connection device;
a first judgment device which, in a case where connection of the recording medium is detected by the detection device, judges whether or not a multi-viewpoint image that is a subject image that is viewed from a plurality of viewpoints is recorded on the recording medium; and
a first protection setting device which, in a case where the first judgment device judges that the multi-viewpoint image is recorded, sets a protection with respect to the recorded multi-viewpoint image so that the multi-viewpoint image is not deleted;
an erase mode setting device which, in a case where images including the multi-viewpoint image are recorded on the recording medium, sets an erase mode that erases a desired image that is selected from among the images;

an erase mode detection device which detects whether or not the erase mode is set; and an erasing device which, when selection of the multi-viewpoint image is confirmed in a case where the erase mode is detected by the erase mode detection device, cancels the protection that is set for the selected multi-viewpoint image and erases the multi-viewpoint image.

11. The image reproducing apparatus according to claim 10, further comprising:

an edit mode setting device which, in a case where images including the multi-viewpoint image are recorded on the recording medium, sets an edit mode that edits a desired image that is selected from among the images;

an edit mode detection device which detects whether or not the edit mode is set;

a protection canceling device which, when selection of the multi-viewpoint image is confirmed in a case where the edit mode is detected by the edit mode detection device, cancels the protection that is set for the selected multi-viewpoint image; and an editing device which edits the multi-viewpoint image for which the protection is cancelled by the protection canceling device, wherein the recording device records the multi-viewpoint image that is edited by the editing device on a recording medium, and the protection setting device is a protection setting device which sets a protection so that the multi-viewpoint image is not changed or deleted, and the protection setting device sets a protection with respect to the edited multi-viewpoint image that is recorded by the recording device so that the multi-viewpoint image is not changed or deleted.

12. An image taking method, comprising the steps of switching between a multi-viewpoint image taking mode that takes a subject image that is viewed from a plurality of viewpoints and a single viewpoint image taking mode that takes a subject image that is viewed from a single viewpoint;

detecting the image taking mode that is switched to;

acquiring a multi-viewpoint image or a single viewpoint image that is taken in the image taking mode that is switched to;

recording the multi-viewpoint image or single viewpoint image that is acquired on a recording medium; and in a case where the multi-viewpoint image taking mode is detected in the step of detecting the image taking mode, setting a protection with respect to the recorded multi-viewpoint image so that the multi-viewpoint image is not changed;

in a case where images including the multi-viewpoint image are recorded on the recording medium, detecting whether or not an edit mode that edits a desired image that is selected from among the images is set;

when selection of the multi-viewpoint image is confirmed in a case where the edit mode is detected, canceling the protection that is set for the selected multi-viewpoint image;

editing the multi-viewpoint image for which the protection is cancelled; and setting a protection with respect to the edited multi-viewpoint image that is recorded on a predetermined recording medium so that the multi-viewpoint image is not changed.

13. A program that causes an arithmetic and logic unit to execute an image taking method according to claim 12.

14. An image taking method, comprising the steps of:

switching between a multi-viewpoint image taking mode that takes a subject image that is viewed from a plurality of viewpoints and a single viewpoint image taking mode that takes a subject image that is viewed from a single viewpoint;

detecting the image taking mode that is switched to;

acquiring a multi-viewpoint image or a single viewpoint image that is taken in the image taking mode that is switched to;

recording the multi-viewpoint image or single viewpoint image that is acquired on a recording medium;

in a case where the multi-viewpoint image taking mode is detected in the step of detecting the image taking mode, setting a protection with respect to the recorded multi-viewpoint image so that the multi-viewpoint image is not deleted;

in a case where images including the multi-viewpoint image are recorded on the recording medium, detecting whether or not an erase mode is set that erases a desired image that is selected from among the images; and when selection of the multi-viewpoint image is confirmed in a case where the erase mode is detected, canceling the protection that is set for the selected multi-viewpoint image and erasing the selected multi-viewpoint image.

15. An image taking method, comprising the steps of:

connection of a recording medium capable of recording a subject image;

detecting that the recording medium is connected;

in a case in which connection of the recording medium is detected, judging whether or not a multi-viewpoint image that is a subject image that is viewed from a plurality of viewpoints is recorded on the recording medium;

in a case in which it is judged that the multi-viewpoint image is recorded in the step of judging whether or not the multi-viewpoint image is recorded on the recording medium, setting a protection with respect to the recorded multi-viewpoint image so that the multi-viewpoint image is not changed;

in a case where images including the multi-viewpoint image are recorded on the recording medium, detecting whether an edit mode that edits a desired image that is selected from among the images is set;

when selection of the multi-viewpoint image is confirmed in a case where the edit mode is detected, canceling the protection that is set for the selected multi-viewpoint image;

editing the multi-viewpoint image for which the protection is cancelled by the protection canceling device; and setting a protection with respect to the edited multi-viewpoint image that is recorded on a predetermined recording medium so that the multi-viewpoint image is not changed.

16. An image taking method, comprising the steps of:

connection of a recording medium capable of recording a subject image;

detecting that the recording medium is connected;

in a case in which connection of the recording medium is detected, judging whether or not a multi-viewpoint image that is a subject image that is viewed from a plurality of viewpoints is recorded on the recording medium;

in a case in which it is judged that the multi-viewpoint image is recorded in the step of judging whether or not the multi-viewpoint image is recorded on the recording medium, setting a protection with respect to the recorded multi-viewpoint image so that the multi-viewpoint image is not deleted;

in a case where images including the multi-viewpoint image are recorded on the recording medium, detecting whether an erase mode that erases a desired image that is selected from among the images is set; and when selection of the multi-viewpoint image is confirmed in a case where the erase mode is detected, canceling the protection that is set for the selected multi-viewpoint image and erasing the selected multi-viewpoint image.

* * * * *